(12) United States Patent
Luo

(10) Patent No.: US 10,650,135 B2
(45) Date of Patent: May 12, 2020

(54) AUTHORIZATION METHOD AND DEVICE FOR JOINT ACCOUNT, AND AUTHENTICATION METHOD AND DEVICE FOR JOINT ACCOUNT

(71) Applicant: Alibaba Group Holding Limited, George Town (KY)

(72) Inventor: Kaiyao Luo, Hangzhou (CN)

(73) Assignee: Alibaba Group Holding Limited, George Town, Grand Cayman (KY)

( * ) Notice: Subject to any disclaimer, the term of this patent is extended or adjusted under 35 U.S.C. 154(b) by 0 days.

(21) Appl. No.: 16/119,470

(22) Filed: Aug. 31, 2018

(65) Prior Publication Data

US 2018/0365410 A1    Dec. 20, 2018

Related U.S. Application Data

(63) Continuation of application No. PCT/CN2017/074317, filed on Feb. 21, 2017.

(30) Foreign Application Priority Data

Mar. 3, 2016    (CN) .......................... 2016 1 0122324

(51) Int. Cl.
*G06F 21/45*    (2013.01)
*H04L 29/06*    (2006.01)
*H04L 9/32*    (2006.01)

(52) U.S. Cl.
CPC ............ *G06F 21/45* (2013.01); *H04L 9/3215* (2013.01); *H04L 9/3226* (2013.01); *H04L 63/08* (2013.01)

(58) Field of Classification Search
CPC ......... H04L 9/32; H04L 63/08; H04L 9/3226; H04L 29/06; H04L 9/08; G06F 21/45; G06F 21/31; G06Q 20/40; G06Q 30/00; G06Q 40/00
See application file for complete search history.

(56) References Cited

U.S. PATENT DOCUMENTS 7,136,489 B1 *  11/2006  Madhusudhana ....... H04L 9/085
                                                         380/277
7,343,014 B2     3/2008  Sovio et al.
(Continued)

FOREIGN PATENT DOCUMENTS

CN    102271035    12/2011
CN    102611558    7/2012
(Continued)

OTHER PUBLICATIONS

Chien-Lung et al., "New identity-based key-insulated convertible multi-authenticated encryption scheme," Journal of Network and Computer Applications, Jun. 2011, 34(5):1724-1731.
(Continued)

*Primary Examiner* — Amir Mehrmanesh
(74) *Attorney, Agent, or Firm* — Fish & Richardson P.C.

(57) ABSTRACT

The present application provides an authorization method for a joint account, applied to client software. The joint account is jointly managed by N joint managers, N is a natural number greater than 1. In one example, a user-side authentication parameter of a joint account is obtained. The user-side authentication parameter is the same as or corresponds to a network-side authentication parameter of the joint account, wherein the user-side authentication parameter is used to perform authentication on operation permissions for the joint account. The obtained user-side authentication parameter is divided into N parts. N joint management authentication parameters are generated based on each of the N parts. Each of the N joint management authentication parameters are transmitted to a different client device associated with each joint manager.

17 Claims, 17 Drawing Sheets

Obtain a user-side authentication parameter of a joint account, where the user-side authentication parameter is the same as or corresponding to a network-side authentication parameter of the joint account, and is used to perform authentication on operation permission for the joint account — 110

Divide the user-side authentication parameter into N parts, and generate a corresponding joint management authentication parameter based on each part; and write each joint management authentication parameter into a device controlled by each joint manager — 120

(56) References Cited

U.S. PATENT DOCUMENTS

| | | | |
|---|---|---|---|
| 8,151,333 B2 | 4/2012 | Zhu et al. | |
| 8,190,757 B1* | 5/2012 | Davis | G06F 21/54 |
| | | | 709/225 |
| 8,285,991 B2 | 10/2012 | Scheidt | |
| 2011/0061097 A1* | 3/2011 | Gregg | G06F 21/335 |
| | | | 726/7 |
| 2013/0167204 A1* | 6/2013 | Gregg | G06F 21/335 |
| | | | 726/4 |
| 2015/0261948 A1 | 9/2015 | Marra et al. | |
| 2019/0266576 A1* | 8/2019 | McCauley | G06Q 20/40145 |

FOREIGN PATENT DOCUMENTS

| | | |
|---|---|---|
| CN | 102833076 | 12/2012 |
| CN | 104917604 | 9/2015 |

OTHER PUBLICATIONS

Extended European Search Report in European Application No. 17759164.1, dated Sep. 16, 2019, 6 pages.

Sunitha et al., "Secure E-cheques for Joint Accounts with Collective Signing Using Forward-Secure Multi-signature Scheme," Seventh IEEE/ACIS International Conference on Computer and Information Science, May 2008, pp. 241-246.

Crosby et al., "BlockChain Technology: Beyond Bitcoin," Sutardja Center for Entrepreneurship & Technology Technical Report, Oct. 16, 2015, 35 pages.

Nakamoto, "Bitcoin: A Peer-to-Peer Electronic Cash System," www.bitcoin.org, 2005, 9 pages.

International Search Report by the International Searching Authority issued in International Application No. PCT/CN2017/074317 dated Apr. 27, 2017; 8 pages.

\* cited by examiner

Obtain a user-side authentication parameter of a joint account, where the user-side authentication parameter is the same as or corresponding to a network-side authentication parameter of the joint account, and is used to perform authentication on operation permission for the joint account ⟶ 110

Divide the user-side authentication parameter into N parts, and generate a corresponding joint management authentication parameter based on each part; and write each joint management authentication parameter into a device controlled by each joint manager ⟶ 120

FIG. 1

AUTHORIZATION METHOD AND DEVICE FOR JOINT ACCOUNT, AND AUTHENTICATION METHOD AND DEVICE FOR JOINT ACCOUNT

CROSS REFERENCE TO RELATED APPLICATIONS

This application is a continuation of PCT Application No. PCT/CN2017/074317, filed on Feb. 21, 2017, which claims priority to Chinese Patent Application No. 201610122324.1, filed on Mar. 3, 2016, and each application is hereby incorporated by reference in its entirety.

TECHNICAL FIELD

The present application relates to the field of network communications technologies, and in particular, to an authorization method and device for a joint account, and an authentication method and device for a joint account.

BACKGROUND

A joint account is an account jointly managed by two or more joint managers, and the joint managers can be natural persons or legal persons. The joint account is applicable to the following scenario: Joint managers need to share the same account due to various reasons, but one of the joint managers cannot obtain all rights (e.g., money transfer and withdrawal) to the account for security or trustworthiness reasons.

Because some rights to the joint account are subject to the consent of all the joint managers, the bank that provides the joint account usually requires that all the joint managers go to the counter to process a service to be authenticated. Consequently, it is inconvenient to perform an operation on the joint account. In the existing technology, each account that can be operated over the network has only one owner. After operation permission of the owner is authenticated, the owner can perform various operations on the electronic account. In other words, in the existing technology, a plurality of owners cannot jointly manage one account over the network.

SUMMARY

In view of this, the present application provides an authorization method for a joint account, applied to client software, where the joint account is jointly managed by N joint managers, N is a natural number greater than 1, and the method includes the following: obtaining a user-side authentication parameter of the joint account, where the user-side authentication parameter is the same as or corresponding to a network-side authentication parameter of the joint account, and is used to perform authentication on operation permission for the joint account; dividing the user-side authentication parameter into N parts, and generating a corresponding joint management authentication parameter based on each part; and writing each joint management authentication parameter into a device controlled by each joint manager.

The present application provides an authorization method for a joint account, applied to a server, where the joint account is jointly managed by N joint managers, N is a natural number greater than 1, and the method includes the following: obtaining a user-side authentication parameter and a network-side authentication parameter of the joint account, and storing the network-side authentication parameter, where the user-side authentication parameter is the same as or corresponding to the network-side authentication parameter, and is used to perform authentication on operation permission for the joint account; dividing the user-side authentication parameter into N parts, and generating a corresponding joint management authentication parameter based on each part; and separately sending joint management authentication parameters to client software of different joint managers.

The present application provides an authorization method for a joint account, applied to client software of a joint manager of the joint account, where the joint account is jointly managed by N joint managers, N is a natural number greater than 1, and the method includes the following: receiving a joint management authentication parameter sent by a server, where the joint management authentication parameter is generated based on one part after the server divides a user-side authentication parameter into N parts, and the user-side authentication parameter is used to perform authentication on operation permission for the joint account; and storing the joint management authentication parameter.

The present application provides an authentication method for a joint account, applied to client software, where the joint account is jointly managed by N joint managers, N is a natural number greater than 1, and the method includes the following: obtaining N joint management authentication parameters of the joint account; restoring one part of a user-side authentication parameter based on each joint management authentication parameter, and combining N parts into the user-side authentication parameter; and initiating an authentication request to a server by using the user-side authentication parameter, so the server performs authentication on operation permission for the joint account based on a network-side authentication parameter, where the network-side authentication parameter is the same as or corresponding to the user-side authentication parameter.

The present application provides an authentication method for a joint account, applied to a server, where the joint account is jointly managed by N joint managers, N is a natural number greater than 1, and the method includes the following: receiving N joint management authentication parameters uploaded by client software; restoring one part of a user-side authentication parameter based on each joint management authentication parameter, and combining N parts into the user-side authentication parameter; and performing authentication on operation permission for the joint account based on a network-side authentication parameter, where the network-side authentication parameter is the same as or corresponding to the user-side authentication parameter.

The present application provides an authentication method for a joint account, applied to client software, where the joint account is jointly managed by N joint managers, N is a natural number greater than 1, and the method includes the following: obtaining a joint management authentication parameter of a joint manager; and uploading the joint management authentication parameter to a server, so the server restores one part of a user-side authentication parameter based on the joint management authentication parameter, combines the part with (N−1) other parts into the user-side authentication parameter, and then performs authentication on operation permission for the joint account by using a network-side authentication parameter that is the same as or corresponding to the user-side authentication parameter.

The present application further provides an authorization device for a joint account, applied to client software, where the joint account is jointly managed by N joint managers, N is a natural number greater than 1, and the device includes the following: a user-side parameter acquisition unit, configured to obtain a user-side authentication parameter of the joint account, where the user-side authentication parameter is the same as or corresponding to a network-side authentication parameter of the joint account, and is used to perform authentication on operation permission for the joint account; and a joint management parameter writing unit, configured to divide the user-side authentication parameter into N parts, generate a corresponding joint management authentication parameter based on each part, and write each joint management authentication parameter into a device controlled by each joint manager.

The present application provides an authorization device for a joint account, applied to a server, where the joint account is jointly managed by N joint managers, N is a natural number greater than 1, and the device includes the following: an authentication parameter acquisition unit, configured to obtain a user-side authentication parameter and a network-side authentication parameter of the joint account, and store the network-side authentication parameter, where the user-side authentication parameter is the same as or corresponding to the network-side authentication parameter, and is used to perform authentication on operation permission for the joint account; a joint management parameter delivery unit, configured to divide the user-side authentication parameter into N parts, and generate a corresponding joint management authentication parameter based on each part; and separately send joint management authentication parameters to client software of different joint managers.

The present application provides an authorization device for a joint account, applied to client software of a joint manager of the joint account, where the joint account is jointly managed by N joint managers, N is a natural number greater than 1, and the device includes the following: a joint management parameter receiving unit, configured to receive a joint management authentication parameter sent by a server, where the joint management authentication parameter is generated based on one part after the server divides a user-side authentication parameter into N parts, and the user-side authentication parameter is used to perform authentication on operation permission for the joint account; and a joint management parameter storage unit, configured to store the joint management authentication parameter.

The present application provides an authentication device for a joint account, applied to client software, where the joint account is jointly managed by N joint managers, N is a natural number greater than 1, and the device includes the following: a joint management parameter acquisition unit, configured to obtain N joint management authentication parameters of the joint account; a user-side parameter combination unit, configured to restore one part of a user-side authentication parameter based on each joint management authentication parameter, and combine N parts into the user-side authentication parameter; and an authentication request initiation unit, configured to initiate an authentication request to a server by using the user-side authentication parameter, so the server performs authentication on operation permission for the joint account based on a network-side authentication parameter, where the network-side authentication parameter is the same as or corresponding to the user-side authentication parameter.

The present application provides an authentication device for a joint account, applied to a server, where the joint account is jointly managed by N joint managers, N is a natural number greater than 1, and the device includes the following: a joint management parameter receiving unit, configured to receive N joint management authentication parameters uploaded by client software; a user-side parameter combination unit, configured to restore one part of a user-side authentication parameter based on each joint management authentication parameter, and combine N parts into the user-side authentication parameter; and an operation permission authentication unit, configured to perform authentication on operation permission for the joint account based on a network-side authentication parameter, where the network-side authentication parameter is the same as or corresponding to the user-side authentication parameter.

The present application provides an authentication device for a joint account, applied to client software, where the joint account is jointly managed by N joint managers, N is a natural number greater than 1, and the device includes the following: a single joint management parameter acquisition unit, configured to obtain a joint management authentication parameter of a joint manager; and a joint management parameter upload unit, configured to upload the joint management authentication parameter to a server, so the server restores one part of a user-side authentication parameter based on the joint management authentication parameter, combines the part with (N−1) other parts into the user-side authentication parameter, and then performs authentication on operation permission for the joint account by using a network-side authentication parameter that is the same as or corresponding to the user-side authentication parameter.

It can be seen from the previous technical solutions that, in the implementations of the present application, the user-side authentication parameter used to perform authentication on the operation permission for the joint account is divided into the N parts, the corresponding joint management authentication parameter is generated based on each part, and the joint management authentication parameter is sent to one joint manager for control, so the joint manager can perform an operation on the joint account after providing the joint management authentication parameter over a network. Therefore, the network-based joint account can be implemented, and the joint manager can manage the joint account very conveniently.

In the implementations of the present application, during authentication performed on the operation permission for the joint account, the N joint managers provide the joint management authentication parameters controlled by themselves, the N joint management authentication parameters are combined into the user-side authentication parameter, and then the server performs permission authentication, so the joint managers can perform the operation on the joint account after providing the joint management authentication parameters. Therefore, the network-based joint account can be implemented, and the joint manager can manage the joint account very conveniently.

BRIEF DESCRIPTION OF DRAWINGS

FIG. 1 is a flowchart illustrating an authorization method for a joint account that is applied to client software, according to Implementation 1 of the present application;

DESCRIPTION OF IMPLEMENTATIONS

Figure 2:
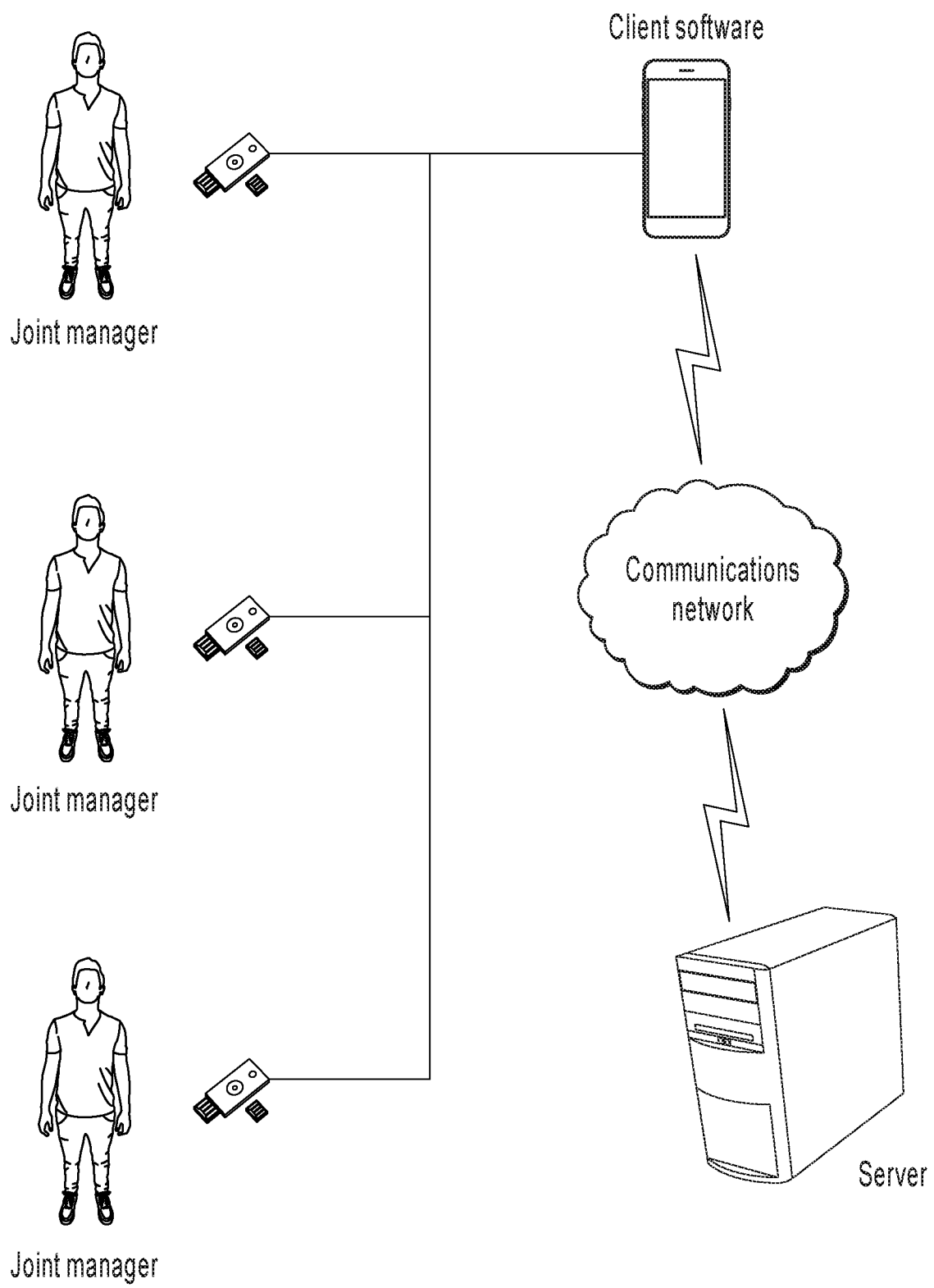
FIG. 2 is a schematic diagram illustrating a network structure of an application scenario, according to Implementation 1 of the present application.

Implementations of the present application provide a new authorization method for a joint account and a new authentication method for a joint account. A user-side authentication parameter of the joint account jointly managed by N (N is a natural number greater than 1) joint managers is divided into N parts, and then one joint management authentication parameter is generated based on each part. N joint management authentication parameters are respectively controlled by the N joint managers. Operation permission can be authenticated by a server after all the joint managers provide the joint management authentication parameters and after the joint management authentication parameters are combined into the user-side authentication parameter. Therefore, the joint manager can manage the joint account over a network, which is more convenient for the joint manager.

In the implementations of the present application, a user-side authentication parameter is the same as or corresponding to a network-side authentication parameter, and is used to perform authentication on operation permission for a joint account. The user-side authentication parameter is kept by a user, and the network-side authentication parameter is stored on a server. The server uses the network-side authentication parameter to perform authentication on the user-side authentication parameter provided by client software, or an operation request initiated by client software by using the user-side authentication parameter. The user can perform an operation requested after the user-side authentication parameter or the operation request is authenticated. In the present application, because the user-side authentication parameter is held by N joint managers, for the interest of each joint manager, a certain joint manager or some joint managers should be prevented from knowing or holding a complete user-side authentication parameter. Therefore, in the implementations of the present application, the user-side authentication parameter and the network-side authentication parameter are usually generated automatically by the client software or the server instead of being determined manually.

In the implementations of the present application, the client software runs on a user-side device. The client software can be a device of one joint manager or a device shared by the N joint managers, and the server runs on a service provider device of the joint account. The devices including the client software and the server can access each other over a network. The device including the client software can be a mobile phone, a tablet computer, a personal computer (PC), a notebook computer, a server, etc. The device including the server can be a PC, a notebook computer, a server, etc. The server can be one physical or logical server, or can be two or more physical or logical servers that take different responsibilities and cooperate with each other to perform various functions in the implementations of the present application. Types of the devices including the client software and the server, and a type, a protocol, etc. of communication between the devices are not limited in the implementations of the present application.

Implementation 1 of the present application describes an authorization method for a joint account. Client software is responsible for generating a joint management authentication parameter based on a user-side network parameter and sending the joint management authentication parameter to a joint manager. A process of the method applied to the client software is shown in FIG. 1.

Step 110: The client software obtains a user-side authentication parameter of the joint account.

As described above, the user-side authentication parameter and a network-side authentication parameter are usually generated automatically. For example, the client software can generate the user-side authentication parameter and the network-side authentication parameter that are the same as or corresponding to each other by using an algorithm, and upload the generated network-side authentication parameter to a server, so the server can use the parameter for authentication. For another example, a server can generate the user-side authentication parameter and the network-side authentication parameter that are the same as or corresponding to each other by using an algorithm, store the network-side authentication parameter, and send the user-side authentication parameter to the client software.

The client software or the server can generate the user-side authentication parameter and the network-side authentication parameter by using various algorithms for generating a key and a password in the existing technology. For example, the client software generates a private key and a public key by using an asymmetric encryption algorithm, uses the private key as the user-side authentication parameter, and uses the public key as the network-side authentication parameter. For another example, the server generates same keys by using a symmetric encryption algorithm, and uses the keys as the user-side authentication parameter and the network-side authentication parameter.

Step 120: The client software divides the user-side authentication parameter into N parts, generates a corresponding joint management authentication parameter based on each part, and writes each joint management authentication parameter into a device controlled by each joint manager.

The client software divides the user-side authentication parameter into the N parts. The N parts do not overlap each other, and can be combined into the complete user-side authentication parameter. The client software generates the corresponding joint management authentication parameter by using each part.

A specific method for dividing the user-side authentication parameter can be determined based on an actual application scenario, an algorithm for generating the joint management authentication parameter, etc. The method is not limited in this implementation of the present application. For example, the user-side authentication parameter can be divided into N segments, and each segment and a corresponding segment sequence number is used as one joint management authentication parameter. The segment sequence number indicates a ranking of the segment in the user-side authentication parameter (for the purpose that all the segments can be sorted in a correct order when being combined into the user-side authentication parameter). For another example, the user-side authentication parameter can be divided into 2N segments, and the kth segment, the (k+N)th segment, and k (k is a natural number ranging from 1 to N) are used as inputs to a mapping algorithm and encrypted to obtain corresponding joint management authentication parameters. In addition, a reverse algorithm of the mapping algorithm can use values obtained by decrypting the joint management authentication parameters as inputs, and output the kth segment, the (k+N)th segment, and k corresponding to the joint management authentication parameters.

The client software writes each of generated N joint management authentication parameters into the device controlled by each joint manager, so the joint manager can use the joint management authentication parameter to grant permission for the joint account. The device where the joint management authentication parameter is written can be a device including the client software of the joint manager, or can be a storage medium that can be separated from a device including the client software of the joint manager.

It is worthwhile to note that, in this implementation, the client software that runs the authorization method for the joint account can be one of client software of N joint managers, or can be client software different from client software of N joint managers. If the joint management authentication parameters are sent by client software of a joint manager to other client software, (N−1) joint management authentication parameters sent to other joint managers cannot exist on client software that generates these parameters.

In an implementation, the client software different from the client software of the N joint managers (e.g., client software of a service organization that starts the joint account) writes each of the generated N common management authentication parameters into a near field communication (NFC) chip of each joint manager. A network structure of an application scenario thereof is shown in FIG. 2. Because the NFC chip supports contactless reading, the joint management authentication parameter is more convenient to use if it is stored in the NFC chip.

Figure 3:
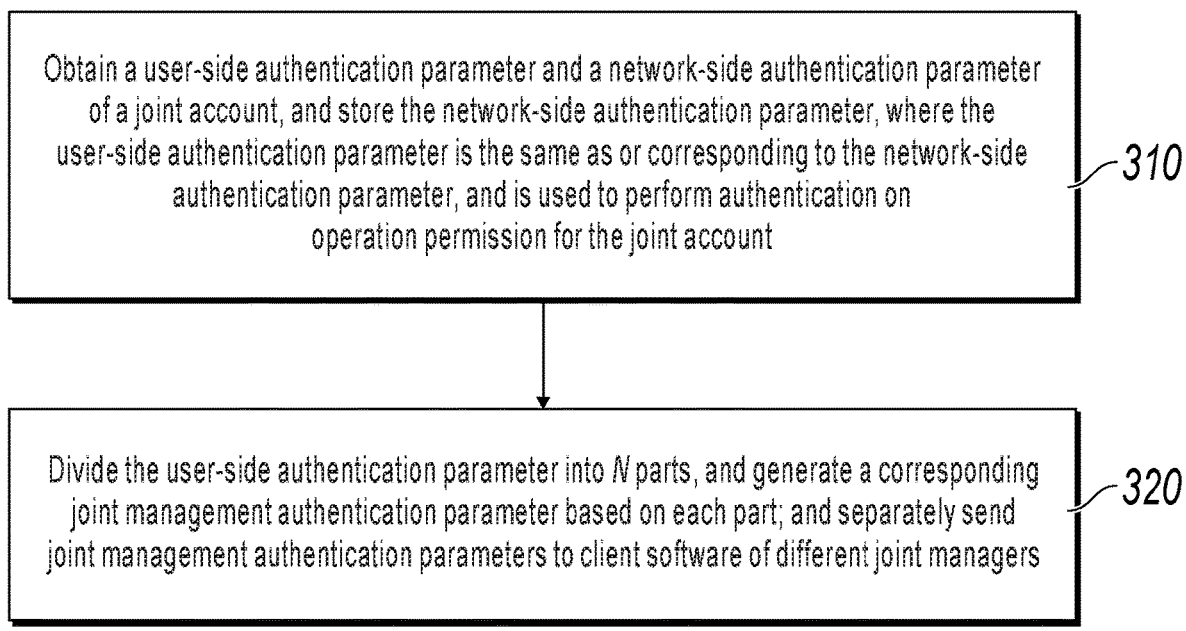
FIG. 3 is a flowchart illustrating an authorization method for a joint account that is applied to a server, according to Implementation 2 of the present application.
Figure 4:
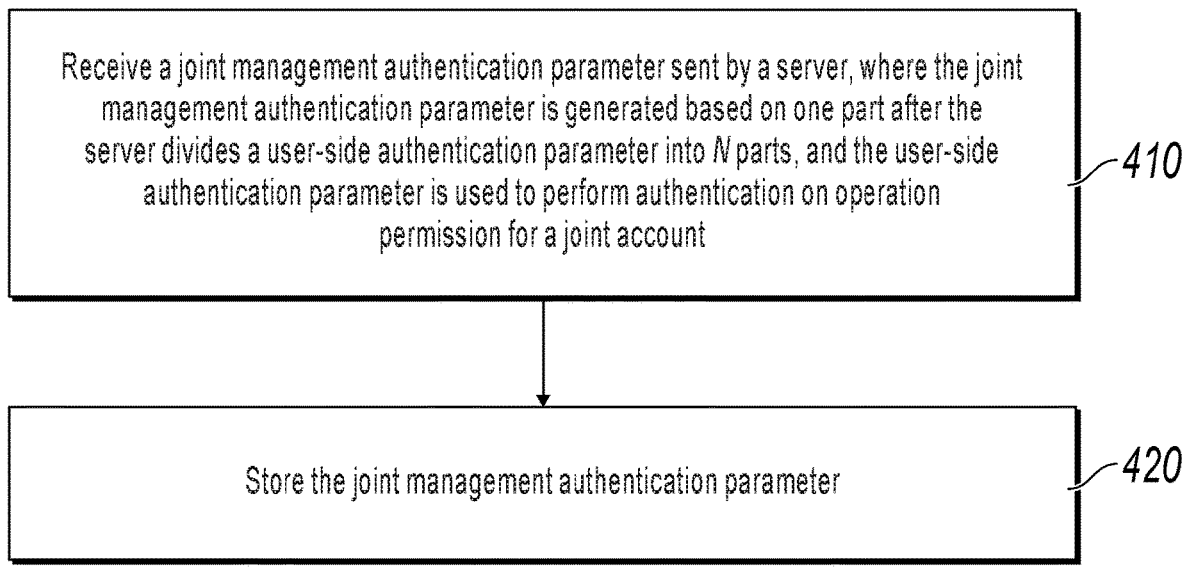
FIG. 4 is a flowchart illustrating an authorization method for a joint account that is applied to client software, according to Implementation 2 of the present application.

Implementation 2 of the present application describes an authorization method for a joint account. A server is responsible for generating a joint management authentication parameter based on a user-side network parameter and sending the joint management authentication parameter to a joint manager. A process of the method applied to the server is shown in FIG. 3, and a process of the method applied to client software is shown in FIG. 4.

Step 310: The server obtains a user-side authentication parameter and a network-side authentication parameter of the joint account, and stores the network-side authentication parameter.

The server can generate the user-side authentication parameter and the network-side authentication parameter that are the same as or corresponding to each other by using an algorithm, or can obtain the user-side authentication parameter and the network-side authentication parameter that are the same as or corresponding to each other from another server that generates a key or a password in a network.

The server can generate the user-side authentication parameter and the network-side authentication parameter by using various algorithms for generating a key and a password in the existing technology. For example, the server can generate same keys by using a symmetric encryption algorithm, and use the keys as the user-side authentication parameter and the network-side authentication parameter.

The server stores the obtained network-side authentication parameter locally or in a storage location accessible in the network.

Step 320: The server divides the user-side authentication parameter into N parts, and generates a corresponding joint management authentication parameter based on each part; and separately sends joint management authentication parameters to client software of different joint managers.

For detailed descriptions of dividing the user-side authentication parameter and generating the joint management authentication parameter by the server, reference can be made to descriptions of the same functions performed by the client software in Implementation 1. Details are omitted here again. In an implementation, the user-side authentication parameter can be divided into N segments, and each segment and a corresponding segment sequence number are used as one joint management authentication parameter.

Figure 5:
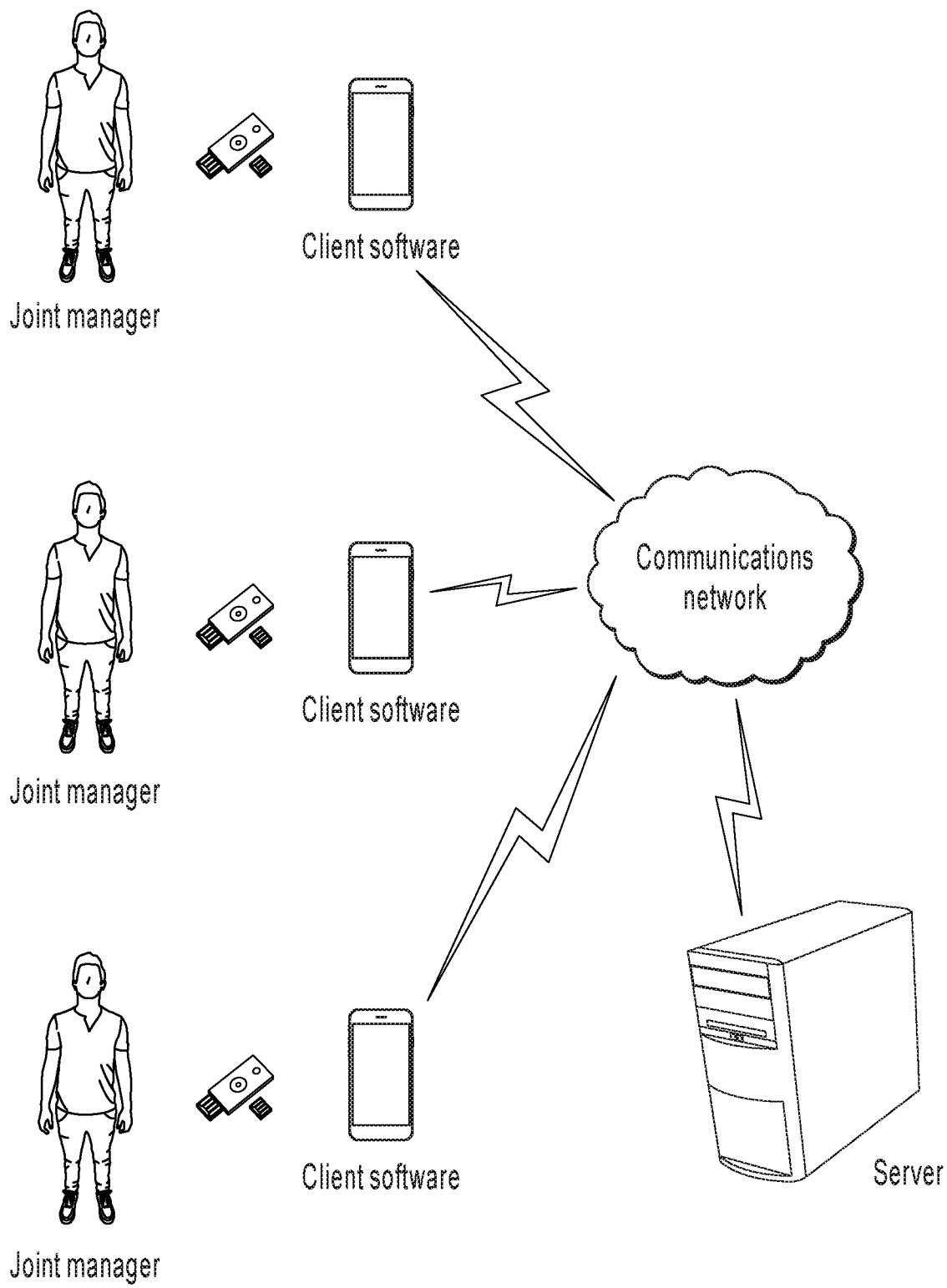
FIG. 5 is a schematic diagram illustrating a network structure of an application scenario, according to Implementation 2 of the present application.

The server separately sends generated N joint management authentication parameters to client software of different joint managers. A network structure of an application scenario thereof is shown in FIG. 5.

Step 410: The client software receives a joint management authentication parameter sent by a server.

A joint management authentication parameter that the server sends to client software of a joint manager is generated by the server based on one part after the server divides a user-side authentication parameter into N parts. In an implementation, the joint management authentication parameter includes one of N segments of the user-side authentication parameter and a corresponding segment sequence number.

Step 420: The client software stores the received joint management authentication parameter.

The client software can store the received joint management authentication parameter in a device including the client software or in a storage medium that can be separated from a device including the client software, such as an NFC chip, a Universal Serial Bus (USB) flash drive, etc.

It can be seen that, in Implementation 1 and Implementation 2 of the present application, the user-side network parameter is divided into the N parts, and then one joint management authentication parameter is generated based on each part. The N joint management authentication parameters are controlled by the N joint managers, and an operation can be performed on the joint account after all the joint managers provide the joint management authentication parameters. In the two previous implementations of the present application, the network-based joint account can be implemented, and the joint manager can manage the account very conveniently.

Figure 6:
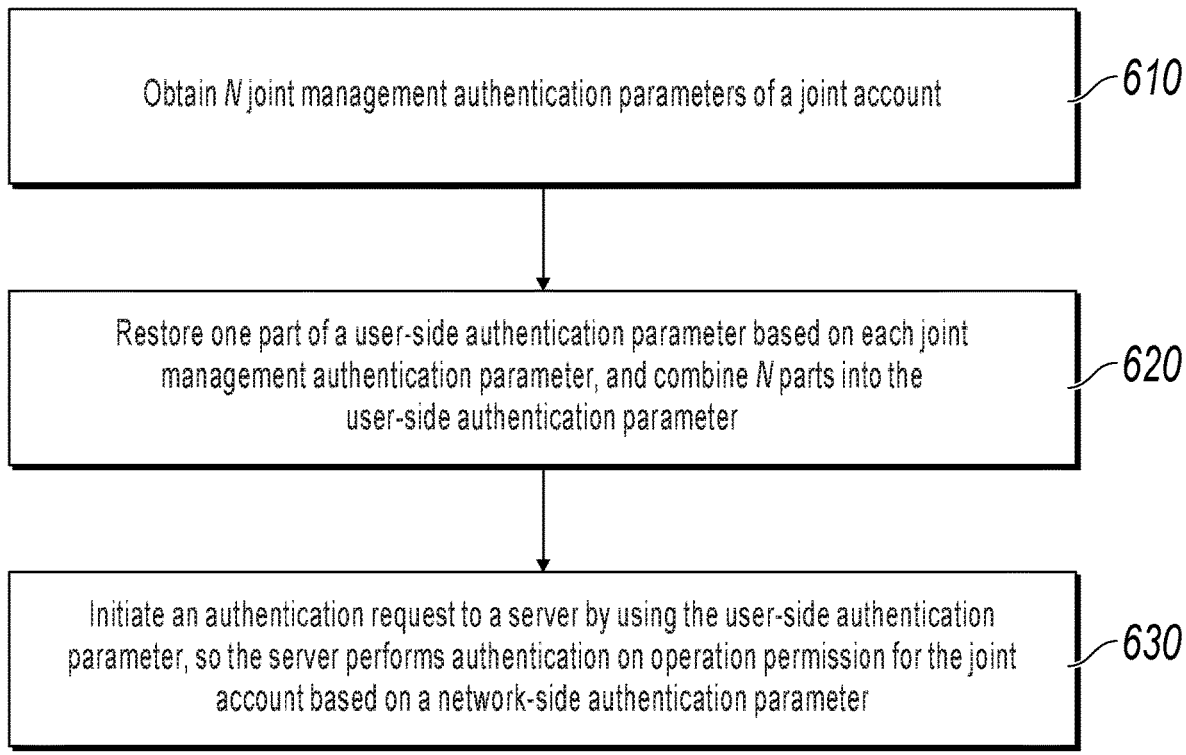
FIG. 6 is a flowchart illustrating an authentication method for a joint account that is applied to client software, according to Implementation 3 of the present application.

Implementation 3 of the present application describes an authentication method for a joint account. Client software is responsible for generating a user-side network parameter based on N joint management authentication parameters. A process of the method applied to the client software is shown in FIG. 6.

Step 610: Obtain N joint management authentication parameters of the joint account.

Each of N joint managers of the joint account controls one joint management authentication parameter. After each of the N joint managers agrees to perform an operation to be authenticated on the joint account, each joint manager can provide the joint management authentication parameter, controlled by the joint manager, to the client software that runs the authentication method for the joint account in this implementation.

If the joint manager stores the joint management authentication parameter, controlled by the joint manager, in a device including client software of the joint manager, the client software that runs the authentication method for the joint account in this implementation can read the N joint management authentication parameters from devices of client software of the N joint managers, or receive the joint management authentication parameters sent by client software of the N joint managers. If the joint manager stores the joint management authentication parameter controlled by the joint manager in a storage medium of the joint manager (e.g., an NFC chip or a USB flash drive of each joint manager), the client software that runs the authentication method for the joint account can read the N joint management authentication parameters from these storage media.

It is worthwhile to note that, in this implementation, the client software that runs the authentication method for the joint account can be client software of a joint manager, or can be client software of a non-joint manager. When the client software that runs the authentication method for the joint account is client software of a joint manager, and a joint management authentication parameter of the joint manager is stored in a device including the client software, the client software can simply read the stored joint management authentication parameter locally.

Step 620: Restore one part of a user-side authentication parameter based on each joint management authentication parameter, and combine N parts into the user-side authentication parameter.

After obtaining the N joint management authentication parameters, the client software restores one corresponding part (that is, a part used to generate a joint management authentication parameter) of the user-side authentication parameter from each joint management authentication parameter inversely by using a method for generating the joint management authentication parameter. N parts are combined to obtain the user-side authentication parameter.

In an example of the previous application scenario that the N segments of the user-side authentication parameters and the corresponding segment sequence numbers are used as the N joint management authentication parameters, one segment of the user-side authentication parameter and a corresponding segment sequence number can be obtained by parsing each joint management authentication parameter, and N segments can be connected sequentially based on corresponding segment sequence numbers, to generate the user-side authentication parameter.

Step 630: Initiate an authentication request to a server by using the user-side authentication parameter, so the server performs authentication on operation permission for the joint account based on a network-side authentication parameter.

The authentication request can be initiated in different forms by using the user-side authentication parameter based on specific implementations of permission authentication between the client software and the server in an actual application scenario. For example, the client software can add the user-side authentication parameter to the authentication request, and the server compares the user-side authentication parameter in the authentication request with the network-side authentication parameter stored on the server. If the user-side authentication parameter is the same as or corresponding to the network-side authentication parameter, the authentication request is authenticated, and the client software can perform an operation requested for the joint account. Otherwise, the request of the client software is rejected.

For another example, when the user-side authentication parameter and the network-side authentication parameter are respectively a private key and a public key of an asymmetric encryption algorithm, the client software can perform digital signature on the authentication request or a certain field or some fields in the authentication request by using the private key (that is, the user-side authentication parameter), and send the authentication request with a digital signature to the server. The server performs signature authentication on the authentication request by using the public key (that is, the network-side authentication parameter) to the joint account that the authentication request requests to operate. If the authentication request is authenticated, the client software is allowed to perform an operation requested for the joint account. Otherwise, the request of the client software is rejected.

Figure 7:
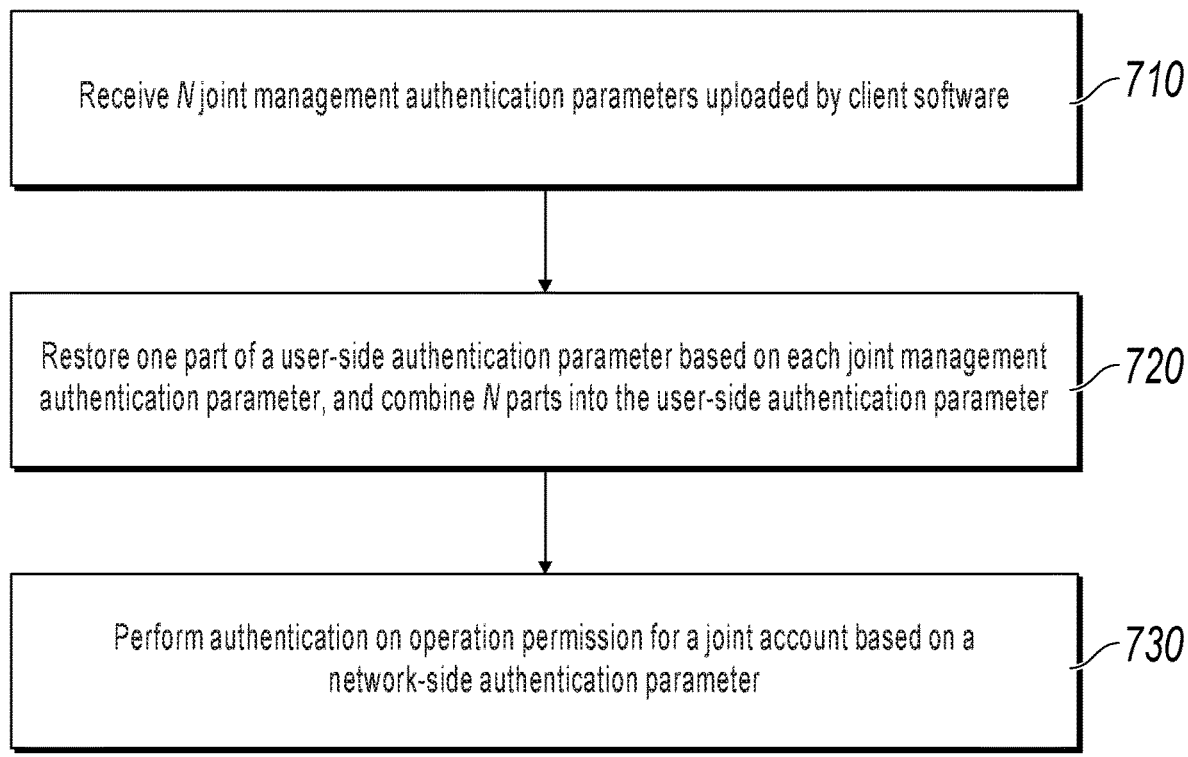
FIG. 7 is a flowchart illustrating an authentication method for a joint account that is applied to client software, according to Implementation 4 of the present application.
Figure 8:
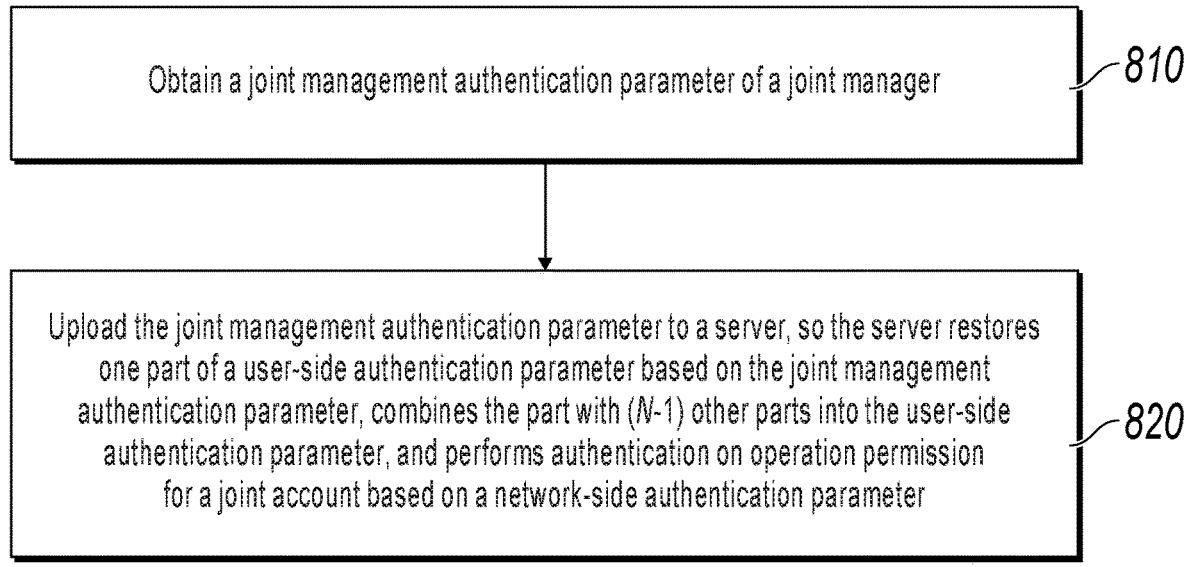
FIG. 8 is a flowchart illustrating an authentication method for a joint account that is applied to a server, according to Implementation 4 of the present application.

Implementation 4 of the present application describes an authentication method for a joint account. A server is responsible for generating a user-side network parameter based on N joint management authentication parameters. A process of the method applied to the server is shown in FIG. 7, and a process of the method applied to client software is shown in FIG. 8.

Step 810: The client software obtains a joint management authentication parameter of a joint manager.

Based on a storage location of the joint management authentication parameter, the client software can read the joint management authentication parameter from a device including the client software, or can receive the joint management authentication parameter sent by client software that stores the joint management authentication parameter, or can read the joint management authentication parameter from a storage medium of the joint manager.

Step 820: The client software uploads the joint management authentication parameter to a server, so the server restores one part of a user-side authentication parameter based on the joint management authentication parameter, combines the part with (N−1) other parts into the user-side authentication parameter, and then performs authentication on operation permission for the joint account by using a network-side authentication parameter that is the same as or corresponding to the user-side authentication parameter.

Step 710: The server receives N joint management authentication parameters uploaded by client software.

Based on different actual application scenarios, the client software can upload the joint management authentication parameter to the server by using a plurality of methods. In this implementation, the client software and the server can support one method, or can support a plurality of methods. Four examples are described below.

In the first example, after all joint managers agree to perform an operation on the joint account, each joint manager instructs client software of the joint manager to obtain a joint management authentication parameter of the joint manager, and send the joint management authentication parameter to the server by using a joint account operation request. The client software can further add joint account operation content to the joint account operation request, to notify the server of the operation that the request requests the server to allow.

In the second example, a joint manager can send a joint account authorization request to client software of other joint managers by using client software of the joint manager. The joint account authorization request includes joint account operation content. Each joint manager (including the joint manager that initiates the authorization request to the other joint managers) that agrees to perform the operation sends a joint account operation request to the server. The joint account operation request includes a joint management authentication parameter of the joint manager (and can also include the operation content).

In the third example, a joint manager sends a joint account operation request to the server. The joint account operation request includes requested operation content. After receiving the joint account operation request, the server sends a joint management authentication parameter upload request to client software of each joint manager of the joint account. The upload request includes operation content that the joint manager initiating the operation request needs to perform. After the client software receives the joint account operation request, if the joint manager agrees to perform the operation, the client software returns its joint management authentication parameter to the server in response to the joint account operation request.

In the fourth example, a joint manager sends a joint account operation request to the server. The joint account operation request includes requested operation content and a joint management authentication parameter of the joint manager. After receiving the joint account operation request, the server sends a joint management authentication parameter upload request to client software of each other joint manager (joint managers other than the joint manager initiating the operation request) of the joint account. The upload request includes the operation content that the joint manager initiating the operation request needs to perform. After the client software of another joint manager receives the joint account operation request, if the joint manager agrees to perform the operation, the client software returns its joint management authentication parameter to the server in response to the joint account operation request.

In the previous examples, when all the joint managers agree to perform the operation requested on the joint account, the server can receive the N joint management authentication parameters uploaded by client software of the N joint managers.

Step 720: The server restores one part of a user-side authentication parameter based on each joint management authentication parameter, and combines N parts into the user-side authentication parameter.

After obtaining the N joint management authentication parameters, the server restores one corresponding part (that is, a part used to generate a joint management authentication parameter) of the user-side authentication parameter from each joint management authentication parameter inversely by using a method for generating the joint management authentication parameter. The N parts are combined to obtain the user-side authentication parameter.

In an example of the previous application scenario that, the N segments of the user-side authentication parameters and the corresponding segment sequence numbers are used as the N joint management authentication parameters, one segment of the user-side authentication parameter and a corresponding segment sequence number can be obtained by parsing each joint management authentication parameter, and N segments can be connected sequentially based on corresponding segment sequence numbers, to generate the user-side authentication parameter.

Step 730: The server performs authentication on operation permission for the joint account based on a network-side authentication parameter.

After generating the user-side authentication parameter, the server matches the network-side authentication parameter stored on the server with the user-side authentication parameter. If the two parameters are the same as or corresponding to each other, the operation permission is authenticated, and the client software is allowed to perform the operation requested for the joint account. Otherwise, the joint account operation request of the client software is rejected.

It can be seen that, in Implementation 3 and Implementation 4 of the present application, after the N joint managers provide the joint management authentication parameters controlled by themselves to the server by using the client software, the server obtains the user-side authentication parameter by using the N joint management authentication parameters, and performs authentication on the operation permission for the joint account by using the network-side authentication parameter. The joint manager can provide the joint management authentication parameter of the joint manager over a network to perform the operation on the joint account. Therefore, the network-based joint account can be implemented, and the joint manager can manage the joint account very conveniently.

A network structure of an application example of the present application is shown in FIG. 2. A device including client software is a mobile device with an NFC function. There are three joint managers (N=3) for a joint account in total, and each joint manager has one NFC tag.

When granting operation permission for the joint account, the mobile device with the NFC function generates a pair of RSA keys to the joint account: a public key and a private key by using an RSA algorithm (an asymmetric encryption algorithm). The public key is uploaded by the mobile device to a server, and stored as a network-side authentication parameter of the joint account. The mobile device divides the private key into three segments, and generates a segment sequence number for each segment. The mobile device uses each segment and a corresponding segment sequence number as a joint management authentication parameter of one joint manager, and writes the joint management authentication parameter into an NFC tag of the joint manager by using an NFC card reader. Three NFC tags where different joint management authentication parameters are written are respectively held by three joint managers.

When expecting to perform an operation to be authenticated on the joint account, the three joint managers provide the NFC tags held by themselves. The mobile device with the NFC function reads the three joint management authentication parameters stored in the three NFC tags by using the NFC card reader. The mobile device obtains one segment and a corresponding segment sequence number by parsing each joint management authentication parameter, and connects three segments based on segment sequence numbers to obtain the private key to the joint account. The mobile device performs digital signature on any data by using the user-side authentication parameter, and uploads the data to the server. The server performs signature authentication on the uploaded data by using the public key to the joint account, to determine whether the data is authenticated. After the data is authenticated, the mobile device can perform the operation on the joint account.

Figure 9:
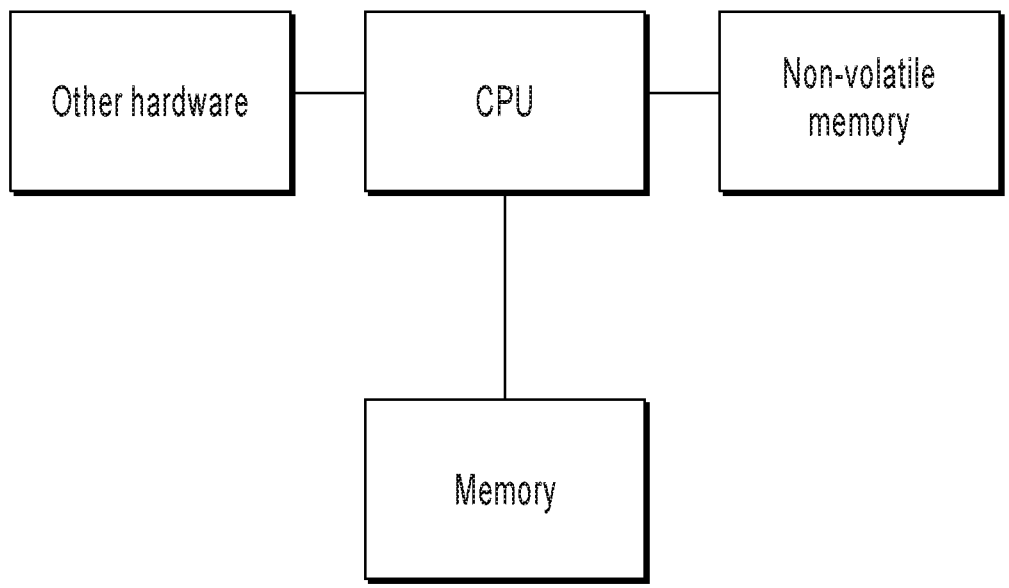
FIG. 9 is a structural hardware diagram illustrating a device including client software or a server.

Corresponding to the previous processes, the implementations of the present application further provide two authorization devices for a joint account that are applied to client software; one authorization device for a joint account that is applied to a server; two authentication devices for a joint account that are applied to client software; and one authentication device for a joint account that is applied to a server. The devices can be implemented by using software, or can be implemented by using hardware or a combination of software and hardware. Software implementation is used as an example. A central processing unit (CPU) of a device including client software or a server reads a corresponding computer program instruction into a memory and the instruction runs to form a logical device. In terms of hardware implementation, in addition to a CPU, a memory, and a nonvolatile memory shown in FIG. 9, the device including the client software or the server generally includes other hardware such as a chip sending and receiving radio signals, and/or other hardware such as a card performing network communication.

Figure 10:
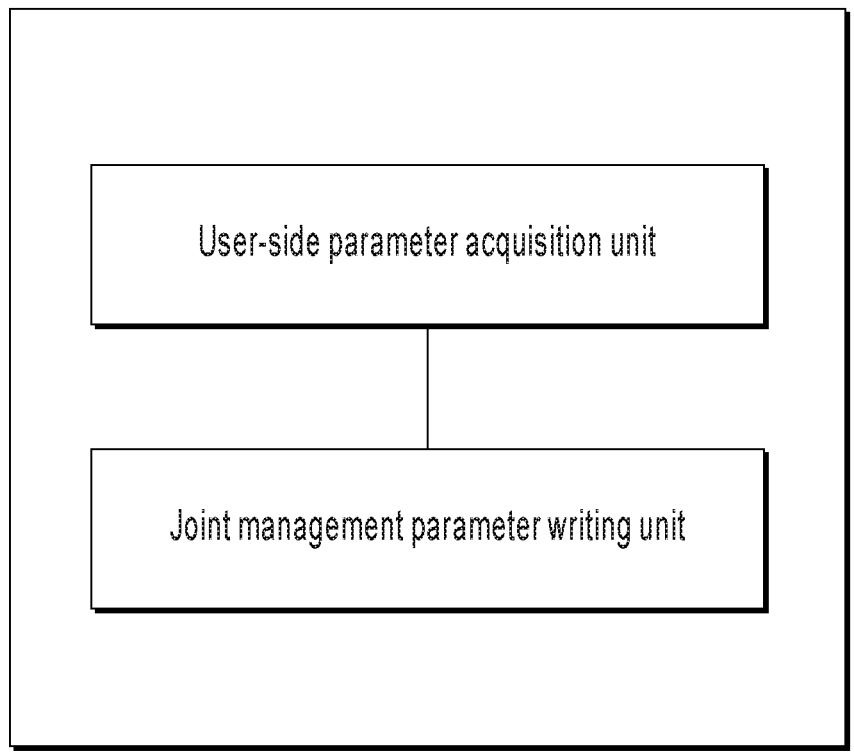
FIG. 10 is a logical structural diagram illustrating an authorization device for a joint account that is applied to client software, according to Implementation 5 of the present application.

FIG. 10 shows an authorization device for a joint account that is applied to client software, according to Implementation 5 of the present application. The joint account is jointly managed by N joint managers, and N is a natural number greater than 1. The device includes a user-side parameter acquisition unit and a joint management parameter writing unit. The user-side parameter acquisition unit is configured to obtain a user-side authentication parameter of the joint account. The user-side authentication parameter is the same as or corresponding to a network-side authentication parameter of the joint account, and is used to perform authentication on operation permission for the joint account. The joint management parameter writing unit is configured to divide the user-side authentication parameter into N parts, and generate a corresponding joint management authentication parameter based on each part; and write each joint management authentication parameter into a device controlled by each joint manager.

For example, the user-side parameter acquisition unit is configured to generate the user-side authentication parameter and the network-side authentication parameter of the joint account, and upload the network-side authentication parameter to a server.

In the previous example, the user-side authentication parameter and the network-side authentication parameter can include a private key and a public key of an asymmetric encryption algorithm.

Optionally, the user-side parameter acquisition unit is configured to receive the user-side authentication parameter generated by a server from the server.

Optionally, the joint management parameter writing unit is configured to divide the user-side authentication parameter into N segments, use each segment and a corresponding segment sequence number as one joint management authentication parameter, and write each joint management authentication parameter into the device controlled by each joint manager.

Optionally, the device controlled by each joint manager includes a near field communication (NFC) chip of each joint manager.

Figure 11:
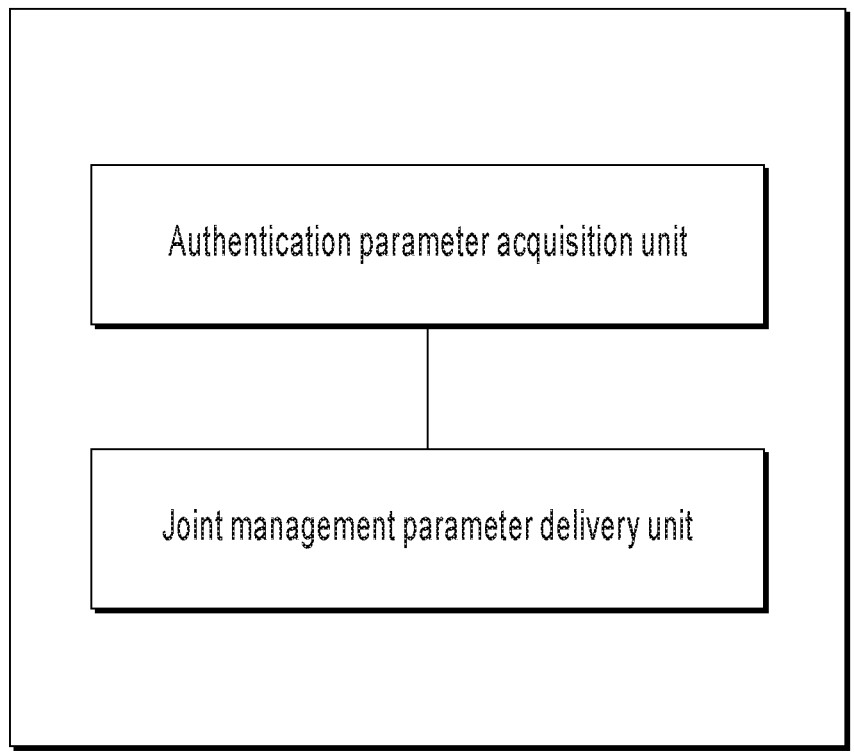
FIG. 11 is a logical structural diagram illustrating an authorization device for a joint account that is applied to a server, according to Implementation 6 of the present application.

FIG. 11 shows an authorization device for a joint account that is applied to a server, according to Implementation 6 of the present application. The joint account is jointly managed by N joint managers, and N is a natural number greater than 1. The device includes an authentication parameter acquisition unit and a joint management parameter delivery unit. The authentication parameter acquisition unit is configured to obtain a user-side authentication parameter and a network-side authentication parameter of the joint account, and store the network-side authentication parameter. The user-side authentication parameter is the same as or corresponding to the network-side authentication parameter, and is used to perform authentication on operation permission for the joint account. The joint management parameter delivery unit is configured to divide the user-side authentication parameter into N parts, and generate a corresponding joint management authentication parameter based on each part; and separately send joint management authentication parameters to client software of different joint managers.

Optionally, the joint management parameter delivery unit is configured to divide the user-side authentication parameter into N segments, use each segment and a corresponding segment sequence number as one joint management authentication parameter, and separately send the joint management authentication parameters to the client software of the different joint managers.

Optionally, the authentication parameter acquisition unit is configured to generate symmetric keys or passwords based on a predetermined algorithm, and use the symmetric keys or passwords as the user-side authentication parameter and the network-side authentication parameter.

Figure 12:
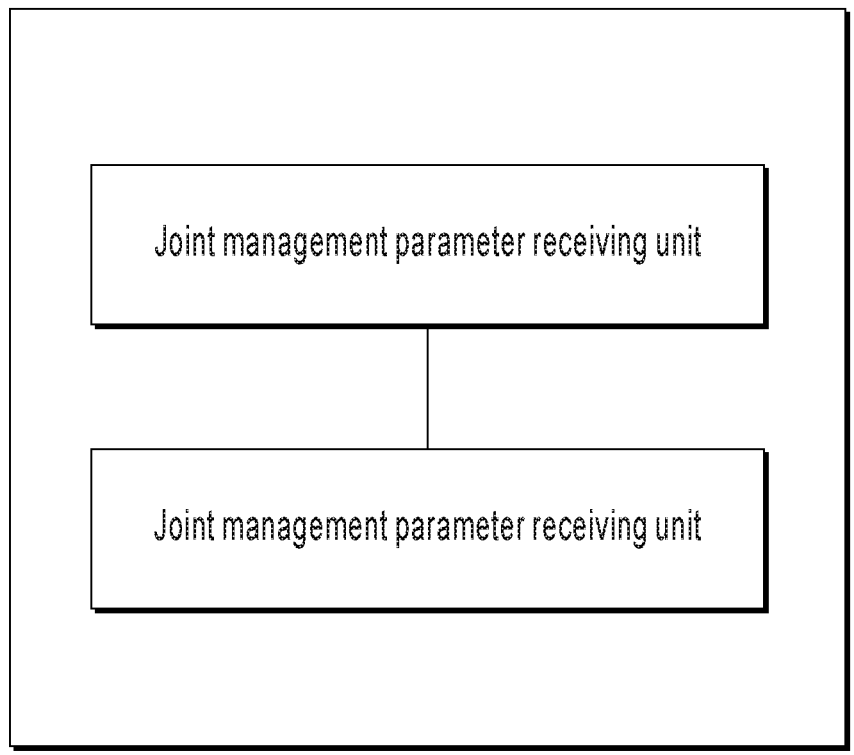
FIG. 12 is a logical structural diagram illustrating an authorization device for a joint account that is applied to client software, according to Implementation 6 of the present application.

FIG. 12 shows an authorization device for a joint account that is applied to client software of a joint manager of the joint account, according to Implementation 6 of the present application. The joint account is jointly managed by N joint managers, and N is a natural number greater than 1. The device includes a joint management parameter receiving unit and a joint management parameter storage unit. The joint management parameter receiving unit is configured to receive a joint management authentication parameter sent by a server. The joint management authentication parameter is generated based on one part after the server divides a user-side authentication parameter into N parts, and the user-side authentication parameter is used to perform authentication on operation permission for the joint account. The joint management parameter storage unit is configured to store the joint management authentication parameter.

Optionally, the joint management authentication parameter includes one of N segments of the user-side authentication parameter and a corresponding segment sequence number.

Optionally, the joint management parameter storage unit is configured to store the joint management authentication parameter in a device including the client software, or store the joint management authentication parameter in a storage medium separated from a device including the client software.

Figure 13:
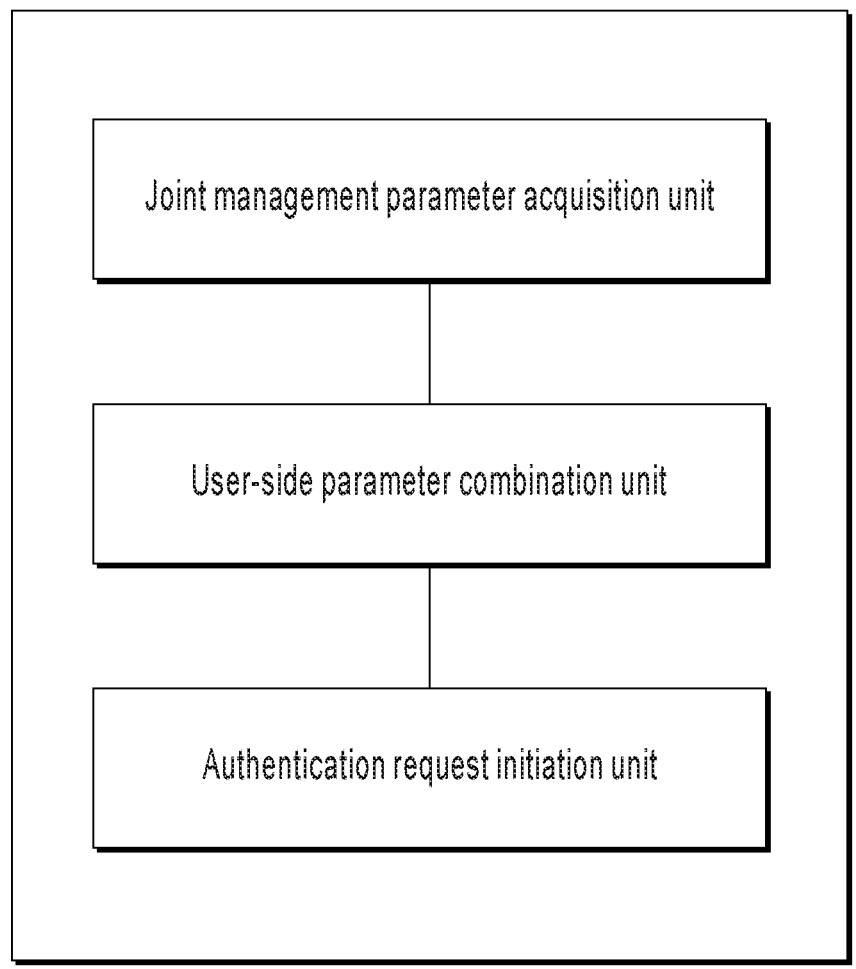
FIG. 13 is a logical structural diagram illustrating an authorization device for a joint account that is applied to client software, according to Implementation 7 of the present application.

FIG. 13 shows an authentication device for a joint account that is applied to client software, according to Implementation 7 of the present application. The joint account is jointly managed by N joint managers, and N is a natural number greater than 1. The device includes a joint management parameter acquisition unit, a user-side parameter combination unit, and an authentication request initiation unit. The joint management parameter acquisition unit is configured to obtain N joint management authentication parameters of the joint account. The user-side parameter combination unit is configured to restore one part of a user-side authentication parameter based on each joint management authentication parameter, and combine N parts into the user-side authentication parameter. The authentication request initiation unit is configured to initiate an authentication request to a server by using the user-side authentication parameter, so the server performs authentication on operation permission for the joint account based on a network-side authentication parameter. The network-side authentication parameter is the same as or corresponding to the user-side authentication parameter.

For example, the joint management parameter acquisition unit is configured to obtain the N joint management authentication parameters of the joint account from devices including client software of the N joint managers; or read the N joint management authentication parameters of the joint account from storage media of the N joint managers.

In the previous example, the storage media of the N joint managers include a near field communication (NFC) chip of each joint manager.

Optionally, the user-side parameter combination unit is configured to restore one segment of the user-side authentication parameter and a corresponding segment sequence number based on each joint management authentication parameter, and connect N segments based on corresponding segment sequence numbers to obtain the user-side authentication parameter.

Optionally, the user-side authentication parameter and the network-side authentication parameter include a private key and a public key of an asymmetric encryption algorithm. The authentication request initiation unit is configured to perform digital signature on the authentication request initiated to the server by using the private key, so the server performs signature authentication on the authentication request by using the public key.

Figure 14:
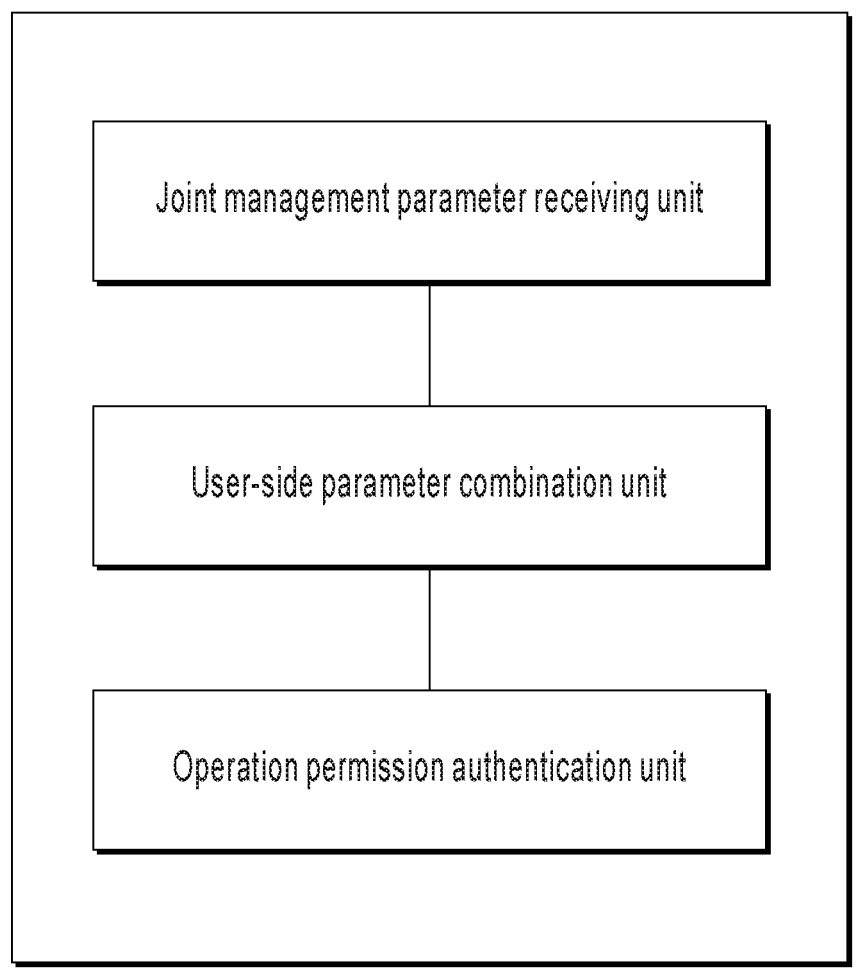
FIG. 14 is a logical structural diagram illustrating an authorization device for a joint account that is applied to a server, according to Implementation 8 of the present application.

FIG. 14 shows an authentication device for a joint account that is applied to a server, according to Implementation 8 of the present application. The joint account is jointly managed by N joint managers, and N is a natural number greater than 1. The device includes a joint management parameter receiving unit, a user-side parameter combination unit, and an operation permission authentication unit. The joint management parameter receiving unit is configured to receive N joint management authentication parameters uploaded by client software. The user-side parameter combination unit is configured to restore one part of a user-side authentication parameter based on each joint management authentication parameter, and combine N parts into the user-side authentication parameter. The operation permission authentication unit is configured to perform authentication on operation permission for the joint account based on a network-side authentication parameter. The network-side authentication parameter is the same as or corresponding to the user-side authentication parameter.

Optionally, the user-side parameter combination unit is configured to restore one segment of the user-side authentication parameter and a corresponding segment sequence number based on each joint management authentication parameter, and connect N segments based on corresponding segment sequence numbers to obtain the user-side authentication parameter.

Optionally, the joint management parameter receiving unit is configured to receive the N joint management authentication parameters respectively uploaded by client software of the N joint managers.

Optionally, the device further includes an operation request receiving unit and a parameter upload request sending unit. The operation request receiving unit is configured to receive a joint account operation request sent by client software of a joint manager. The joint account operation request includes operation content. The parameter upload request sending unit is configured to send a joint management authentication parameter upload request to client software of (N−1) other joint managers. The joint management authentication parameter upload request includes the operation content.

Figure 15:
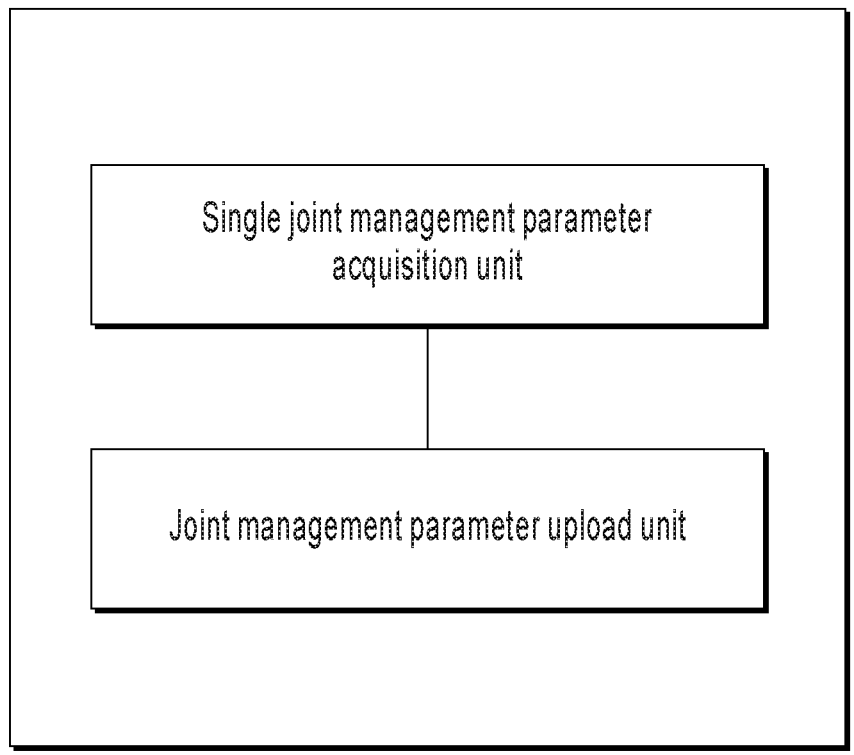
FIG. 15 is a logical structural diagram illustrating an authorization device for a joint account that is applied to client software, according to Implementation 8 of the present application.

FIG. 15 shows an authentication device for a joint account that is applied to client software, according to Implementation 8 of the present application. The joint account is jointly managed by N joint managers, and N is a natural number greater than 1. The device includes a single joint management parameter acquisition unit and a joint management parameter upload unit. The single joint management parameter acquisition unit is configured to obtain a joint management authentication parameter of a joint manager. The joint management parameter upload unit is configured to upload the joint management authentication parameter to a server, so the server restores one part of a user-side authentication parameter based on the joint management authentication parameter, combines the part with (N−1) other parts into the user-side authentication parameter, and then performs authentication on operation permission for the joint account by using a network-side authentication parameter that is the same as or corresponding to the user-side authentication parameter.

Optionally, the single joint management parameter acquisition unit is configured to obtain the joint management authentication parameter from a device including client software of the joint manager; or read the joint management authentication parameter from a storage medium of the joint manager.

Optionally, the device further includes an operation request sending unit, configured to send a joint account operation request to the server. The joint account operation request includes operation content.

Optionally, the device further includes a parameter upload request receiving unit, configured to receive a joint management authentication parameter upload request sent by the server. The joint management authentication parameter upload request includes operation content in a joint account operation request initiated by the joint manager. The joint management parameter upload unit is configured to upload the joint management authentication parameter to the server in response to the joint management authentication parameter upload request.

The previous descriptions are merely example implementations of the present application, but are not intended to limit the present application. Any modification, equivalent replacement, or improvement made without departing from the spirit and principle of the present application shall fall within the protection scope of the present application.

In a typical configuration, a computing device includes one or more central processing units (CPU), an input/output interface, a network interface, and a memory.

The memory can include a non-persistent memory, a random access memory (RAM), and/or a nonvolatile memory in a computer readable medium, for example, a read-only memory (ROM) or a flash memory. The memory is an example of the computer readable medium.

The computer readable medium includes persistent, non-persistent, movable, and unmovable media that can store information by using any method or technology. The information can be a computer readable instruction, a data structure, a program module, or other data. An example of the computer storage medium includes but is not limited to a phase-change random access memory (PRAM), a static random access memory (SRAM), a dynamic random access memory (DRAM), a random access memory (RAM) of another type, a read-only memory (ROM), an electrically erasable programmable read-only memory (EEPROM), a flash memory or another memory technology, a compact disc read-only memory (CD-ROM), a digital versatile disc (DVD) or other optical storage, a cassette magnetic tape, tape and disk storage or another magnetic storage device or any other non-transmission media that can be configured to store information that can be accessed by the computing device. As described in the present specification, the computer readable medium does not include a transitory computer readable medium (transitory media) such as a modulated data signal and a carrier.

It is worthwhile to further note that the term "include", "contain", or any other variant thereof is intended to cover a non-exclusive inclusion, so a process, a method, an article, or a device that includes a list of elements not only includes those elements but also includes other elements which are not expressly listed, or further includes elements inherent to such a process, method, article, or device. An element preceded by "includes a . . . " does not, without more constraints, preclude the existence of additional identical elements in the process, method, article, or device that includes the element.

A person skilled in the art should understand that the implementations of the present application can be provided as a method, a system, or a computer program product. Therefore, the present application can use a form of hardware only implementations, software only implementations, or implementations with a combination of software and hardware. Moreover, the present application can use a form of a computer program product that is implemented on one or more computer-usable storage media (including but not limited to a magnetic disk storage, a CD-ROM, an optical memory, etc.) that include computer-usable program code.

Figure 16:
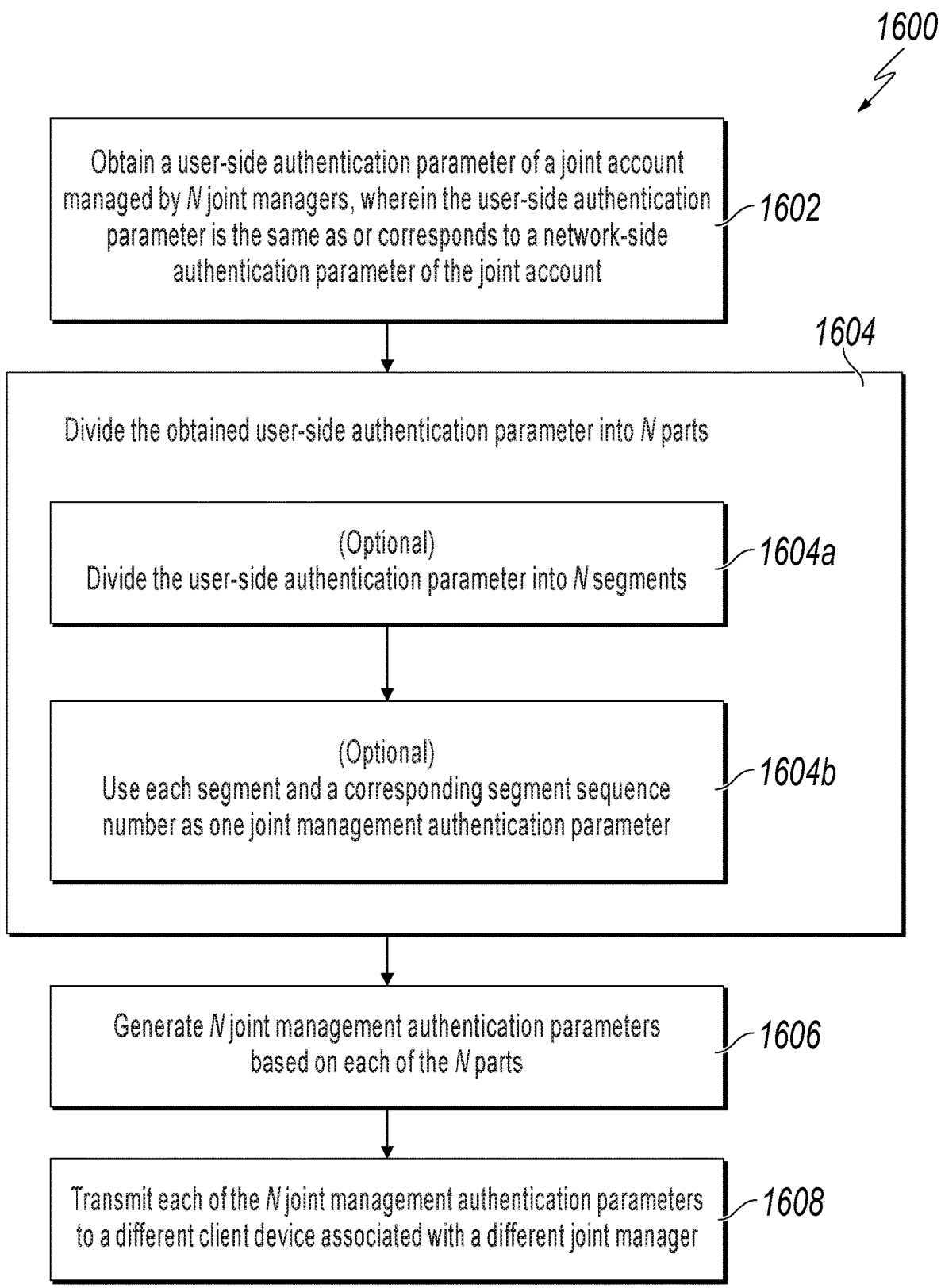
FIG. 16 is a flowchart illustrating an example of a computer-implemented method for authorizing a joint account, according to an implementation of the present disclosure.

FIG. 16 is a flowchart illustrating an example of a computer-implemented method 1600 for authorizing a joint account, according to an implementation of the present disclosure. For clarity of presentation, the description that follows generally describes method 1600 in the context of the other figures in this description. However, it will be understood that method 1600 can be performed, for example, by any system, environment, software, and hardware, or a combination of systems, environments, software, and hardware, as appropriate. In some implementations, various steps of method 1600 can be run in parallel, in combination, in loops, or in any order.

In the illustrated example, a user-side authentication parameter of a joint account is jointly managed by N, where N is a natural number greater than 1, joint managers. The user-side authentication parameter is split into N pieces, with each piece used to generate a joint management authentication parameter associated with one of the N joint managers. Each of the N joint management authentication parameters can then be managed or controlled by one of the N joint managers. Operation permission for the joint account can be authenticated after all the joint managers provide their respective joint management authentication parameters and after all of the N joint management authentication parameters are combined into the full user-side authentication parameter. By doing so, the joint managers can manage the joint account over a network without requiring each of the joint managers to be present for a transaction.

As described, the user-side authentication parameter can be the same as or can correspond to a network-side authentication parameter, which is used to perform authentication on operation permission for various operations associated with the joint account. The user-side authentication parameter is kept by a user or split among the N joint users, while the network-side authentication parameter is stored on a server or in another suitable location apart from the users, where the network-side authentication parameter can be accessed.

The server, or another suitable system, can use the network-side authentication to perform authentication on the user-side authentication parameter provided by a client, software, or set of client software, or to authenticate an operation request initiated by client software using the user-side authentication parameter. The user can perform an operation requested after the user-side authentication parameter or the operation request is authenticated. Because the user-side authentication parameter is managed and split between the N joint managers, some or all of the joint managers can be prevented from knowing or holding a complete user-side authentication parameter. By doing so, security for performing joint account actions can be greatly increased, as a single joint manager cannot cause an action to be performed and cannot authenticate the user-side authentication parameter without assistance from all other of the N joint managers.

In some instances, the client or client device including client software may include or be represented by a mobile phone, a tablet computer, a personal computer (PC), a notebook computer, a server, or any other suitable computing system. Similarly, the server may be a PC, a notebook, a server, a cloud-based system, or any suitable system.

Returning to FIG. 16, an example method for generating a joint management authentication parameter based on a user-side network parameter is illustrated. The operations described herein may include additional or alternative operations, as well as modifications or variations within each element. Any suitable changes may be made by a person of skill in the art.

At 1602, a user-side authentication parameter of a joint account managed by N joint managers is obtained. The user-side authentication parameter is the same as, or corresponds to, a network-side authentication parameter of the joint account. The user-side authentication parameter and the network-side authentication parameter can be generated automatically. In one example, the two parameters can be generated using a particular algorithm. The generation of the parameters can be performed on a client device, a server, or another suitable system. The network-side authentication parameter can be uploaded to or otherwise stored at a server or other system, where the server can use the parameter for authentication operations. The user-side authentication parameter can be generated at the server in some instances, with the user-side authentication parameter later split or segmented into N segments or components, and then provided to the relevant or appropriate devices associated with the N joint managers. In some instances, the user-side authentication parameter and the network-side authentication parameters can be generated using an algorithm for generating a key and a password. In one example, a private key and a public key can be generated using an asymmetric encryption algorithm, where the private key is used as the user-side authentication parameter and the public key is used as the network-side authentication parameter. In other instances, a symmetric encryption algorithm can be used, where the same keys are generated and used as the user-side and network-side authentication parameters. From 1602, method 1600 proceeds to 1604.

At 1604, the obtained user-side authentication parameter is divided into N parts. The N parts do not overlap one another, and, when combined, form the complete user-side authentication parameter. The corresponding joint management authentication parameters may, in some instances, be generated by using each of the N parts. Various methods for dividing the user-side authentication parameter can be used depending on specific use cases and scenarios. In one example, as shown in 1604*a* and 1604*b*, the user-side authentication parameter can be divided into N segments at 1604*a*. Each segment may be associated with a corresponding segment sequent number, where the segment sequence number indicates an order of the particular segment in the user-side authentication parameter. At 1604*b*, each segment and the corresponding segment sequence number can be used as one joint management authentication parameter. In such a manner, when the N segments are received from various joint managers, the segments can be correctly ordered and the user-side authentication parameter can be regenerated properly. For another example, the user-side authentication parameter can be divided into 2N segments, and the kth segment, the (k+N)th segment, and k (k is a natural number ranging from 1 to N) are used as inputs to a mapping algorithm and encrypted to obtain corresponding joint management authentication parameters. In addition, a reverse algorithm of the mapping algorithm can use values obtained by decrypting the joint management authentication parameters as inputs, and output the kth segment, the (k+N)th segment, and k corresponding to the joint management authentication parameters. From 1604, method 1600 proceeds to 1606. At 1606, N joint management authentication parameters are generated based on each of the N parts (from 1604). Those parts may, in some instances, each be associated with a segment sequence number, as described above. In some implementations, the N joint management authentication parameters represent the separated portions of the user-side authentication parameter. From 1606, method 1600 proceeds to 1608.

At 1608, each of the N joint management authentication parameters are transmitted to a different client device controlled by or associated with a different one of the joint managers, such that the joint manager can use the joint management authentication parameter to grant permission for the joint account. The client device to which the joint management authentication parameter is written or transmitted to can be any device including client software of the joint manager, a storage medium separated from and associated with the device including the client software of the joint manager, or any other suitable location accessible by or associated with the particular joint manager. In some instances, a client software associated with a particular joint manager may be performing the operations for generating the N joint management authentication parameters. In those instances, N−1 joint management authentication parameters may be transmitted at 1608, while the particular joint manager can store the generated joint authentication parameter associated with itself in the appropriate location.

In some instances, client software different from the client software of the N joint managers (e.g., client software of a service organization that starts the joint account) can writes or transmit each of the generated N common management authentication parameters into a near field communication (NFC) chip of each joint manager. Because the NFC chip supports contactless reading, the joint management authentication parameter is more convenient to use if it is stored in the NFC chip. After 1608, method 1600 stops.

Figure 17:
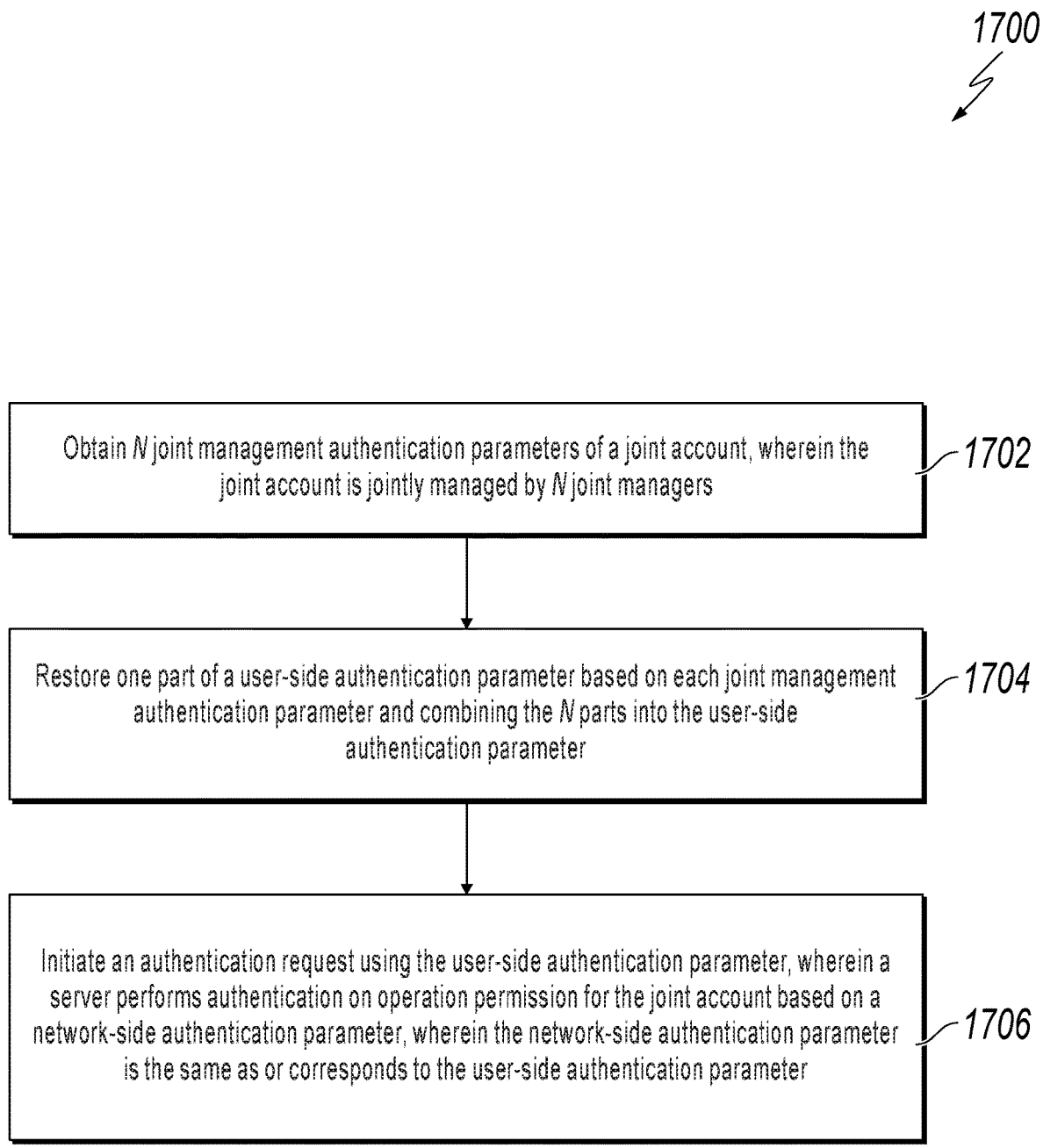
FIG. 17 is a flowchart illustrating an example of a computer-implemented method for authorizing a joint account, according to an implementation of the present disclosure.

FIG. 17 is a flowchart illustrating an example of a computer-implemented method 1700 for authorizing a joint account, according to an implementation of the present disclosure. For clarity of presentation, the description that follows generally describes method 1700 in the context of the other figures in this description. However, it will be understood that method 1700 can be performed, for example, by any system, environment, software, and hardware, or a combination of systems, environments, software, and hardware, as appropriate. In some implementations, various steps of method 1700 can be run in parallel, in combination, in loops, or in any order.

At 1702, N joint management authentication parameters of a joint account are obtained, wherein the joint account is jointly managed by N joint managers, and wherein N is a natural number greater than 1. In the illustrated method, each of the N joint managers of the joint account controls one joint management parameter. When each of the N joint managers agrees to perform an operation to be authenticated on the joint account, each joint manager can provide their respective joint management authentication parameter, controlled by the respective joint manager, to the server or backend system performing the authentication.

In some instances, after all joint managers agree to perform an operation on the joint account, each joint manager instructs client software of the respective joint manager to obtain a joint management authentication parameter of the joint manager, and can transmit or otherwise send the joint management authentication parameter to a centralized component or system (e.g., the server) by using a joint account operation request. The client software of each particular joint manager can further add joint account operation content to the joint account operation request to notify the server of the operation that the request requests the server to allow.

In another instance, a joint manager can send a joint account authorization request to client software of other joint managers by using client software of the initiating joint manager. The joint account authorization request includes joint account operation content. Each joint manager (including the joint manager that initiates the authorization request to the other joint managers) that agrees to perform the operation sends a joint account operation request to the server or other component managing the authentication of the network-side authentication parameter. The joint account operation request includes a joint management authentication parameter of the respective joint manager, and can also include the operation content.

In a third instance, a joint manager can send a joint account operation request to the server or other component. The joint account operation request can include requested operation content. After receiving the joint account operation request, the server can send a joint management authentication parameter upload request to client software of each joint manager of the joint account. The upload request can include operation content that the joint manager initiating the operation request needs to perform. After the client software of a particular joint manager receives the joint account operation request, that client software can return its joint management authentication parameter to the server in response to the joint account operation request if the joint manager agrees to perform the operation.

In a fourth instance, a joint manager can send a joint account operation request to the server. The joint account operation request can include requested operation content and a joint management authentication parameter of the joint manager. After receiving the joint account operation request, the server can send a joint management authentication parameter upload request to client software of each other joint manager (e.g., joint managers other than the joint manager initiating the operation request) of the joint account. The upload request can include the operation content that the joint manager initiating the operation request needs to perform. After the client software of another joint manager receives the joint account operation request, and if the joint manager agrees to perform the operation, the client software can return its joint management authentication parameter to the server in response to the joint account operation request.

In the previous examples, when all the joint managers agree to perform the operation requested on the joint account, the server can receive or obtain the N joint management authentication parameters uploaded by client software of the N joint managers.

From 1702, method 1700 proceeds at 1704.

At 1704, one part of a user-side authentication parameter is restored based on each joint management authentication parameter, and the N parts are combined into the user-side authentication parameter. After obtaining the N joint management authentication parameters, the client software restores one corresponding part (that is, a part used to generate a joint management authentication parameter) of the user-side authentication parameter from each joint management authentication parameter. In some instances, the restoration can be performed inversely by using a same method used for generating the joint management authentication parameter. The N parts that are restored are combined to obtain the user-side authentication parameter.

In one example, the N segments of the user-side authentication parameters may be associated with corresponding segment sequence numbers, where those segments and the corresponding segment sequence numbers are used as the N joint management authentication parameters. In those instances, one segment of the user-side authentication parameter and a corresponding segment sequence number can be obtained by parsing each joint management authentication parameter. The N segments can then be connected sequentially based on corresponding segment sequence numbers to generate the user-side authentication parameter.

From 1704, method 1700 proceeds to 1706.

At 1706, an authentication request can be initiated using the user-side authentication parameter, wherein a server performs authentication on operation permission for the joint account based on a network-side authentication parameter. As previously described, the network-side authentication parameter is the same as or corresponds to the user-side authentication parameter.

In general, the authentication request can be initiated in different forms using the user-side authentication parameter based on specific implementations of permission authentication between the client software and the server in different use cases and application scenarios. In one example, the client software can add the user-side authentication parameter to the authentication request, and the server can compare the user-side authentication parameter in the authentication request with the network-side authentication parameter stored on the server. If the user-side authentication parameter is the same as or corresponding to the network-side authentication parameter, the authentication request is authenticated, and the client software can perform an operation requested for the joint account. Otherwise, the request of the client software is rejected.

In another example, when the user-side authentication parameter and the network-side authentication parameter are respectively a private key and a public key of an asymmetric encryption algorithm, the client software can perform or apply a digital signature on the authentication request or a certain field or some fields in the authentication request using the private key (that is, the user-side authentication parameter), and can send the authentication request with a digital signature to the server. The server can then perform signature authentication on the authentication request using the public key (that is, the network-side authentication parameter) to the joint account that the authentication request requests to operate. If the authentication request is authenticated based on the digital signature analysis, the client software is allowed to perform an operation requested for the joint account. Otherwise, the request of the client software is rejected.

After 1706, method 1700 stops.

In some instances, if the joint manager stores the joint management authentication parameter, controlled by the joint manager, in a device including client software of the joint manager, the N joint management authentication parameters can be read from devices of client software of the N joint managers. Alternatively, the joint management authentication parameters can be received after being sent by client software of the N joint managers. If the joint manager stores the joint management authentication parameter controlled by the joint manager in a storage medium of the joint manager (such as on an NFC chip or a USB flash drive of each joint manager), the N joint management authentication parameters can be read from these storage media.

Embodiments and the operations described in this specification can be implemented in digital electronic circuitry, or in computer software, firmware, or hardware, including the structures disclosed in this specification or in combinations of one or more of them. The operations can be implemented as operations performed by a data processing apparatus on data stored on one or more computer-readable storage devices or received from other sources. A data processing apparatus, computer, or computing device may encompass apparatus, devices, and machines for processing data, including by way of example a programmable processor, a computer, a system on a chip, or multiple ones, or combinations, of the foregoing. The apparatus can include special purpose logic circuitry, for example, a central processing unit (CPU), a field programmable gate array (FPGA) or an application-specific integrated circuit (ASIC). The apparatus can also include code that creates an execution environment for the computer program in question, for example, code that constitutes processor firmware, a protocol stack, a database management system, an operating system (for example an operating system or a combination of operating systems), a cross-platform runtime environment, a virtual machine, or a combination of one or more of them. The apparatus and execution environment can realize various different computing model infrastructures, such as web services, distributed computing and grid computing infrastructures.

A computer program (also known, for example, as a program, software, software application, software module, software unit, script, or code) can be written in any form of programming language, including compiled or interpreted languages, declarative or procedural languages, and it can be deployed in any form, including as a stand-alone program or as a module, component, subroutine, object, or other unit suitable for use in a computing environment. A program can be stored in a portion of a file that holds other programs or data (for example, one or more scripts stored in a markup language document), in a single file dedicated to the program in question, or in multiple coordinated files (for example, files that store one or more modules, sub-programs, or portions of code). A computer program can be executed on one computer or on multiple computers that are located at one site or distributed across multiple sites and interconnected by a communication network.

Processors for execution of a computer program include, by way of example, both general- and special-purpose microprocessors, and any one or more processors of any kind of digital computer. Generally, a processor will receive instructions and data from a read-only memory or a random-access memory or both. The essential elements of a computer are a processor for performing actions in accordance with instructions and one or more memory devices for storing instructions and data. Generally, a computer will also include, or be operatively coupled to receive data from or transfer data to, or both, one or more mass storage devices for storing data. A computer can be embedded in another device, for example, a mobile device, a personal digital assistant (PDA), a game console, a Global Positioning System (GPS) receiver, or a portable storage device. Devices suitable for storing computer program instructions and data include non-volatile memory, media and memory devices, including, by way of example, semiconductor memory devices, magnetic disks, and magneto-optical disks. The processor and the memory can be supplemented by, or incorporated in, special-purpose logic circuitry.

Mobile devices can include handsets, user equipment (UE), mobile telephones (for example, smartphones), tablets, wearable devices (for example, smart watches and smart eyeglasses), implanted devices within the human body (for example, biosensors, cochlear implants), or other types of mobile devices. The mobile devices can communicate wirelessly (for example, using radio frequency (RF) signals) to various communication networks (described below). The mobile devices can include sensors for determining characteristics of the mobile device's current environment. The sensors can include cameras, microphones, proximity sensors, GPS sensors, motion sensors, accelerometers, ambient light sensors, moisture sensors, gyroscopes, compasses, barometers, fingerprint sensors, facial recognition systems, RF sensors (for example, Wi-Fi and cellular radios), thermal sensors, or other types of sensors. For example, the cameras can include a forward- or rear-facing camera with movable or fixed lenses, a flash, an image sensor, and an image processor. The camera can be a megapixel camera capable of capturing details for facial and/or iris recognition. The camera along with a data processor and authentication information stored in memory or accessed remotely can form a facial recognition system. The facial recognition system or one-or-more sensors, for example, microphones, motion sensors, accelerometers, GPS sensors, or RF sensors, can be used for user authentication.

To provide for interaction with a user, embodiments can be implemented on a computer having a display device and an input device, for example, a liquid crystal display (LCD) or organic light-emitting diode (OLED)/virtual-reality (VR)/augmented-reality (AR) display for displaying information to the user and a touchscreen, keyboard, and a pointing device by which the user can provide input to the computer. Other kinds of devices can be used to provide for interaction with a user as well; for example, feedback provided to the user can be any form of sensory feedback, for example, visual feedback, auditory feedback, or tactile feedback; and input from the user can be received in any form, including acoustic, speech, or tactile input. In addition, a computer can interact with a user by sending documents to and receiving documents from a device that is used by the user; for example, by sending web pages to a web browser on a user's client device in response to requests received from the web browser.

Embodiments can be implemented using computing devices interconnected by any form or medium of wireline or wireless digital data communication (or combination thereof), for example, a communication network. Examples of interconnected devices are a client and a server generally remote from each other that typically interact through a communication network. A client, for example, a mobile device, can carry out transactions itself, with a server, or through a server, for example, performing buy, sell, pay, give, send, or loan transactions, or authorizing the same. Such transactions may be in real time such that an action and a response are temporally proximate; for example an individual perceives the action and the response occurring substantially simultaneously, the time difference for a response following the individual's action is less than 1 millisecond (ms) or less than 1 second (s), or the response is without intentional delay taking into account processing limitations of the system.

Examples of communication networks include a local area network (LAN), a radio access network (RAN), a metropolitan area network (MAN), and a wide area network (WAN). The communication network can include all or a portion of the Internet, another communication network, or a combination of communication networks. Information can be transmitted on the communication network according to various protocols and standards, including Long Term Evolution (LTE), 5G, IEEE 802, Internet Protocol (IP), or other protocols or combinations of protocols. The communication network can transmit voice, video, biometric, or authentication data, or other information between the connected computing devices.

Features described as separate implementations may be implemented, in combination, in a single implementation, while features described as a single implementation may be implemented in multiple implementations, separately, or in any suitable sub-combination. Operations described and claimed in a particular order should not be understood as requiring that the particular order, nor that all illustrated operations must be performed (some operations can be optional). As appropriate, multitasking or parallel-processing (or a combination of multitasking and parallel-processing) can be performed.

What is claimed is:

1. A computer-implemented method, comprising:
obtaining a user-side authentication parameter of a joint account, wherein the joint account is jointly managed by N joint managers, wherein N is a natural number greater than 1, and wherein the user-side authentication parameter is a private key that corresponds to a public key that is a network-side authentication parameter of the joint account, wherein the user-side authentication parameter is used to perform authentication on operation permissions for the joint account;
dividing the private key that is the user-side authentication parameter into N parts;
generating a different corresponding sequence number for each part of the N parts of the private key;
generating a corresponding joint management authentication parameter for each part of the N parts of the private key based on a corresponding part of the N parts of the private key and the different corresponding sequence number of the corresponding part of the N parts; and
transmitting each of the N joint management authentication parameters to a different client device, each different client device associated with a different one of the N joint managers.

2. The computer-implemented method of claim 1, wherein obtaining the user-side authentication parameter of the joint account comprises:
generating the user-side authentication parameter and the network-side authentication parameter of the joint account; and
uploading the network-side authentication parameter to a server.

3. The computer-implemented method of claim 2, wherein the user-side authentication parameter and the network-side authentication parameter comprise a private key and a public key of an asymmetric encryption algorithm.

4. The computer-implemented method of claim 1, wherein obtaining the user-side authentication parameter of the joint account comprises receiving the user-side authentication parameter generated by a server from the server.

5. The computer-implemented method of claim 1, wherein obtaining a user-side authentication parameter of a joint account comprises obtaining the network-side authentication parameter and storing the network-side authentication parameter.

6. A computer-implemented method, comprising:
obtaining N joint management authentication parameters of a joint account wherein each of the N joint management authentication parameters comprises a corresponding part of a private key and a corresponding sequence number different from other sequence numbers, and wherein the joint account is jointly managed by N joint managers, and wherein N is a natural number greater than 1;
restoring one part of a user-side authentication parameter based on each joint management authentication parameter;
combining, according to each corresponding sequence number, N parts of the private key into the user-side authentication parameter; and
initiating an authentication request using the user-side authentication parameter, wherein a server performs authentication on operation permission for the joint account based on a network-side authentication parameter, wherein the network-side authentication parameter is the public key that corresponds to the user-side authentication parameter.

7. The computer-implemented method of claim 6, wherein the obtaining N joint management authentication parameters of the joint account comprises:
obtaining the N joint management authentication parameters of the joint account from devices comprising client software of the N joint managers; or
reading the N joint management authentication parameters of the joint account from storage media of the N joint managers.

8. The computer-implemented method of claim 7, wherein the storage media of the N joint managers comprises a near field communication (NFC) chip of each joint manager.

9. The computer-implemented method of claim 6, wherein combining according to each corresponding sequence number N parts of the private key into the user-side authentication parameter comprises:
connecting the N joint management authentication parameters based on respective sequence numbers to obtain the user-side authentication parameter.

10. The computer-implemented method of claim 6, wherein the user-side authentication parameter and the network-side authentication parameter comprise a private key and a public key of an asymmetric encryption algorithm, and wherein initiating the authentication request to the server by using the user-side authentication parameter, wherein the server performs authentication on operation permission for the joint account based on a network-side authentication parameter comprises:
performing application of a digital signature on the authentication request initiated to the server by using the private key, wherein the server performs signature authentication on the authentication request by using the public key.

11. The computer-implemented method of claim 6, wherein obtaining N joint management authentication parameters of a joint account comprises receiving N joint management authentication parameters uploaded by client software.

12. The computer-implemented method of claim 6, wherein obtaining the N joint management authentication parameters of a joint account comprises:
receiving a joint account operation request including requested operation content from a first joint manager;
after receiving the joint account operation request from the first joint manager, transmitting a joint management authentication parameter upload request to each of other joint managers of the joint account, the joint management authentication parameter upload request including operation content that the first joint manager initiating the operation request needs to perform; and
receiving N−1 joint management authentication parameters of the joint account from the other joint managers in response to the upload request.

13. A non-transitory, computer-readable medium storing one or more instructions executable by a computer system to perform operations comprising:
obtaining a user-side authentication parameter of a joint account, wherein the joint account is jointly managed by N joint managers, wherein N is a natural number greater than 1, and wherein the user-side authentication parameter is a private key that corresponds to a public key that is a network-side authentication parameter of the joint account, wherein the user-side authentication parameter is used to perform authentication on operation permissions for the joint account;

dividing the private key that is the user-side authentication parameter into N parts;
generating a different corresponding sequence number for each part of the N parts of the private key;
generating a corresponding joint management authentication parameter for each part of the N parts of the private key based on a corresponding part of the N parts of the private key and the different corresponding sequence number of the corresponding part of the N parts; and
transmitting each of the N joint management authentication parameters to a different client device, each different client device associated with a different one of the N joint managers.

14. The non-transitory, computer-readable medium of claim 13, wherein obtaining the user-side authentication parameter of the joint account comprises:
generating the user-side authentication parameter and the network-side authentication parameter of the joint account; and
uploading the network-side authentication parameter to a server.

15. The non-transitory, computer-readable medium of claim 14, wherein the user-side authentication parameter and the network-side authentication parameter comprise a private key and a public key of an asymmetric encryption algorithm.

16. The non-transitory, computer-readable medium of claim 13, wherein obtaining the user-side authentication parameter of the joint account comprises receiving the user-side authentication parameter generated by a server from the server.

17. The non-transitory, computer-readable medium of claim 13, wherein obtaining a user-side authentication parameter of a joint account comprises obtaining the network-side authentication parameter and storing the network-side authentication parameter.

* * * * *

UNITED STATES PATENT AND TRADEMARK OFFICE
CERTIFICATE OF CORRECTION

PATENT NO. : 10,650,135 B2
APPLICATION NO. : 16/119470
DATED : May 12, 2020
INVENTOR(S) : Kaiyao Luo Page 1 of 1

It is certified that error appears in the above-identified patent and that said Letters Patent is hereby corrected as shown below:

In the Claims

In Claim 9, Column 26, Line 16, after "number" insert -- the --.

Signed and Sealed this
Twenty-seventh Day of October, 2020

Andrei Iancu
*Director of the United States Patent and Trademark Office*